US011746196B2

(12) United States Patent
Brunner et al.

(10) Patent No.: US 11,746,196 B2
(45) Date of Patent: Sep. 5, 2023

(54) CALCIUM CARBONATE AS CAVITATION AGENT FOR BIAXIALLY ORIENTED POLYPROPYLENE FILMS

(71) Applicant: Omya International AG, Oftringen (CH)

(72) Inventors: Martin Brunner, Wallbach (CH); Christoph Hirsiger, Koppigen (CH); Pierre Blanchard, Reyrieux (FR); Christophe René Pierre Roux, Lyons (FR)

(73) Assignee: Omya International AG, Oftringen (CH)

( * ) Notice: Subject to any disclaimer, the term of this patent is extended or adjusted under 35 U.S.C. 154(b) by 497 days.

(21) Appl. No.: 16/306,268

(22) PCT Filed: Jul. 17, 2017

(86) PCT No.: PCT/EP2017/068023
§ 371 (c)(1),
(2) Date: Nov. 30, 2018

(87) PCT Pub. No.: WO2018/015341
PCT Pub. Date: Jan. 25, 2018

(65) Prior Publication Data
US 2019/0218352 A1 Jul. 18, 2019

(30) Foreign Application Priority Data
Jul. 21, 2016 (EP) .................................... 16180663

(51) Int. Cl.
C08J 5/18 (2006.01)
C08K 3/26 (2006.01)
C08K 9/04 (2006.01)
B32B 27/20 (2006.01)
B29C 48/08 (2019.01)
B29C 48/00 (2019.01)
C08F 110/06 (2006.01)
C08J 3/22 (2006.01)
C08K 9/08 (2006.01)
B29K 23/00 (2006.01)
B29K 105/04 (2006.01)
B29K 105/16 (2006.01)
B29K 509/00 (2006.01)

(52) U.S. Cl.
CPC ............. C08J 5/18 (2013.01); B29C 48/0018 (2019.02); B29C 48/08 (2019.02); B32B 27/205 (2013.01); C08F 110/06 (2013.01); C08J 3/226 (2013.01); C08K 3/26 (2013.01); C08K 9/04 (2013.01); B29K 2023/12 (2013.01); B29K 2105/041 (2013.01); B29K 2105/16 (2013.01); B29K 2509/00 (2013.01); C08J 2323/12 (2013.01); C08K 9/08 (2013.01); C08K 2003/265 (2013.01); C08K 2201/003 (2013.01); C08K 2201/005 (2013.01); C08K 2201/006 (2013.01)

(58) Field of Classification Search
CPC .......... C08J 5/18; C08J 3/226; C08J 2323/12; C08K 3/26; C08K 9/04; C08K 2003/265; C08K 2201/005; C08K 2201/006; C08F 110/06; B29K 2023/12; B29C 48/08; B29C 48/0018
USPC ....................................................... 428/515
See application file for complete search history.

(56) References Cited

U.S. PATENT DOCUMENTS

| | | | |
|---|---|---|---|
| 3,897,519 | A | 7/1975 | Berg et al. |
| 4,126,650 | A | 11/1978 | Via et al. |
| 4,350,645 | A | 9/1982 | Kurosaki et al. |
| 4,921,990 | A | 5/1990 | Uphues et al. |
| 5,176,953 | A | 1/1993 | Jacoby et al. |
| 5,326,625 | A | 7/1994 | Schuhmann et al. |
| 5,489,471 | A | 2/1996 | Inoue et al. |
| 5,498,474 | A | 3/1996 | Schuhmann et al. |
| 5,554,781 | A | 9/1996 | Reierson |
| 5,876,857 | A | 3/1999 | Schuhmann et al. |
| 6,136,750 | A | 10/2000 | Ota et al. |
| 6,710,199 | B2 | 3/2004 | Tsuyutani et al. |
| 7,297,755 | B2 | 11/2007 | Shelby et al. |
| 8,088,848 | B2 | 1/2012 | Denecker |
| 10,131,791 | B2 | 11/2018 | Gane et al. |
| 2004/0097616 | A1 | 5/2004 | Hoppler et al. |
| 2004/0213981 | A1 | 10/2004 | Clark et al. |

(Continued)

FOREIGN PATENT DOCUMENTS

| | | |
|---|---|---|
| EP | 0 785 858 A1 | 7/1997 |
| EP | 1 092 000 | 4/2001 |

(Continued)

OTHER PUBLICATIONS

Morieras et al., Packaging Films, Mar. 2013, vol. 4, Jul. 6-8, 2013. (Year: 2013).*
Collins et al. (1996) Pesticide Formulations and Application Systems: 15th Volume. West Conshohocken, PA: ASTM International, 213 pages.
Die Tenside; Kosswig und Stache, Carl Hanser Verlag München Wier, 1993, Table of Contents—in German with English language translation (33 pages).

(Continued)

Primary Examiner — Hui H Chin
(74) Attorney, Agent, or Firm — ALGM LLP; Harry J. Guttman

(57) ABSTRACT

The present invention relates to a mono or multi-layer biaxially oriented polypropylene film having a density of ≤0.72 g/cm³, a process for producing the mono or multi-layer biaxially oriented polypropylene film, the use of at least one natural calcium carbonate as cavitation agent in the mono or multi-layer biaxially oriented polypropylene film, an article comprising the mono or multi-layer biaxially oriented polypropylene film as well as the uses.

23 Claims, No Drawings

(56) References Cited

U.S. PATENT DOCUMENTS

| | | |
|---|---|---|
| 2006/0115548 A1 | 6/2006 | Marchante Moreno et al. |
| 2010/0041811 A1 | 2/2010 | Gane et al. |
| 2011/0214794 A1 | 9/2011 | Kochem et al. |
| 2013/0086874 A1* | 4/2013 | Liestman ............... B32B 27/08 53/455 |
| 2017/0218148 A1* | 8/2017 | Brunner .................... C08J 5/18 |

FOREIGN PATENT DOCUMENTS

| | | |
|---|---|---|
| EP | 1 112 167 A1 | 7/2001 |
| EP | 2 390 285 A1 | 11/2011 |
| EP | 2 722 368 A1 | 4/2014 |
| EP | 2 770 017 A1 | 8/2014 |
| EP | 3 028 830 A1 | 6/2016 |
| JP | H04309546 A | 11/1992 |
| JP | H07102096 A | 4/1995 |
| JP | H07232397 A | 9/1995 |
| JP | H11157211 A | 6/1999 |
| JP | 2001071430 A | 3/2001 |
| JP | 2007044930 A | 2/2007 |
| JP | 2008163225 A | 7/2008 |
| JP | 2010077297 A | 4/2010 |
| JP | 2010523786 A | 7/2010 |
| RU | 2297331 C2 | 11/2004 |
| TW | 201619260 * | 6/2016 |
| TW | 201619260 A | 6/2016 |
| WO | 03/033574 A1 | 4/2003 |
| WO | 2008/023076 A1 | 2/2008 |
| WO | 2009/052921 A1 | 4/2009 |
| WO | 2010/039375 A1 | 4/2010 |
| WO | 2011/068728 A1 | 6/2011 |
| WO | 2013/030210 A1 | 3/2013 |
| WO | 2013/105552 A1 | 7/2013 |
| WO | 2015/070360 A1 | 5/2015 |
| WO | 2016/023937 A1 | 2/2016 |

OTHER PUBLICATIONS

Morieras & Brunner (2013) "Cavitation and Gloss" Packaging Films Mar. 2013, vol. 4, pp. 6-8.
English-language abstract from Espacenet of JP2001071430A, 2001 (1 page).
English-language abstract from Espacenet of JP2007044930A, 2007 (1 page).
International Search Report dated Oct. 20, 2017 from PCT/EP2017/068023.
Written Opinion of the International Searching Authority dated Oct. 20, 2017 from PCT/EP2017/068023.
"Horiba Scientific, A Guidebook to Particle Size Analysis," Jan. 1, 2012, retrieved from the internet at http://www.horiba.com/fileadmin/uploads/Scientific/eMag/PSA/Guidebook/pdf/PSA_Guidebook.pdf, retrieved on Apr. 23, 2013, pp. 1-32.
JP 2019-502602—3rd Party Observations (1 page).
JP 2019-502602—3rd Party Observations—English Translation (8 pages).
JP2008163225A English-language abstract from Espacenet, 2008 (1 page).
JP2010077297A English-language abstract from Espacenet, 2010 (1 page).
Masuda (1986) "Synthetic Paper "Yupo"; Present States and Further Developments" Paper Technology Cooperative Magazine, vol. 40, No. 12, pp. 1110-1121.
Masuda (1986) "Synthetic Paper "Yupo"; Present States and Further Developments" Paper Technology Cooperative Magazine, vol. 40, No. 12, pp. 1110-1121. English Translation (19 pages).
Morieras et al. (2013) "Cavitation and gloss: the right Calcium Carbonates for sustainable manufacturing processes" from BOPP Film 2013, AMI Conference, Singapore, Jun. 25-27, 2013 with program attached (29 pages).
JPH07232397A English-language abstract from Espacenet, 1995 (1 page).

* cited by examiner

CALCIUM CARBONATE AS CAVITATION AGENT FOR BIAXIALLY ORIENTED POLYPROPYLENE FILMS

CROSS-REFERENCE TO RELATED APPLICATIONS

This is a U.S. national phase of PCT Application No. PCT/EP2017/068023, filed Jul. 17, 2017, which claims priority to European Application No. 16180663.3, filed Jul. 21, 2016.

The present invention relates to a mono or multi-layer biaxially oriented polypropylene film having a density of $\leq 0.72$ g/cm$^3$, a process for producing the mono or multi-layer biaxially oriented polypropylene film, the use of at least one natural calcium carbonate as cavitation agent in the mono or multi-layer biaxially oriented polypropylene film, an article comprising the mono or multi-layer biaxially oriented polypropylene film as well as the uses.

Biaxially oriented polypropylene (BOPP) films, which are also known as oriented polypropylene films, are used in a wide variety of technical applications such as packaging products such as food packagings, packaging bags, flexible packagings and candy bar wrappers, wrappings, films such as shrinkable films, release films, twist films, mat films and non-electrical capacitor films, labels, textiles, stationery goods, photo albums, envelopes, windows, catalogues, manuals, maps, audio/video cassettes, industrial tapes such as pressure sensitive tapes, box sealing tapes and masking tapes, laminated metallized brochure catalogues, print laminations, carton boxes, cosmetic boxes, restaurant menus, electrical articles such as cable insulations and capacitors.

It is well known that low density articles can be produced through the addition of cavitating agents. For example, voids are obtained by incorporating about 5 to about 50 wt.-% of small organic or inorganic agents or "inclusions" (referred in the art as "voiding" or "cavitation" agents) into a matrix polymer and orienting the polymer by stretching in at least one direction. During stretching, small cavities or microvoids are formed around the voiding agent. When voids are introduced into polymer films, the resulting voided film not only has a lower density than the non-voided film, but also becomes opaque and develops a paper-like surface. This surface also has the advantage of increased printability; that is, the surface is capable of accepting many inks with a substantially greater capacity over a non-voided film. In either case, the creation of small cavitations/holes in the article leads to a lowering of the density, an increase in the opacity and insulating properties, and inherent UV blocking without the need of a separate UV absorber because of the scattering of light by the voids. Microvoided articles have the added benefit of lower overall film cost and greater ease separation/recyclability, especially where such articles are used in packaging applications such as, for example, as labels (see e.g. U.S. Pat. No. 7,297,755 B2).

In principle, the formation of voids is based on the generation of microcracks at the interface between the polymer and the voiding agent during longitudinal stretching. During subsequent transverse stretching, these fine longitudinal cracks tear open to form air-filled, closed hollow spaces. Hence, it seems plausible that the generation of voids during simultaneous orientation is disproportionately more difficult than during sequential orientation. Indeed, it becomes apparent in practice that the particles incompatible in polypropylene that are common, such as CaCO$_3$ or PBT, do not generate voids at all or generate them only with a selective particle shape or particle size (see e.g. WO 03/033574) during simultaneous orientation. For this process, an alternative technology for generating voids by means of foaming agents was therefore developed.

In the art, several attempts have been made to improve the mechanical and optical properties of polypropylene films by adding organic or inorganic filler materials and especially calcium carbonate-comprising filler materials.

For example, US 2013/0086874 A1 refers to an opaque, cavitated, oriented polypropylene film comprising: at least one core layer having a first and second side comprising polypropylene and from 2 wt.-% to 30 wt.-% calcium carbonate and from 0.5 wt.-% to 20 wt.-% of a whitening agent, each based on the weight of the core layer materials; and at least one skin layer adhered to each of the first and second sides of the core layer. WO 2011/068728 A1 relates to multi-layer opaque films comprising a cavitated core layer, two skin layers and at least one tie layer intermediate the core layer and one of the skin layers. WO 03/033574 A1 refers to a simultaneously oriented polyolefinic film comprising particles in at least one layer thereof, said particles incompatible with said layer to cause the initiation of voids therein when the cast polyolefin is stretched simultaneously in both the MD and TD, and where the particles comprise: (i) particles having a mean aspect ratio x/y of at least 2 and a mean size of the longest particle dimension greater than about 3 µm; and/or (ii) particles having a mean aspect ratio of about 1, with a narrow size distribution, a mean particle size of from about 3 to about 10 µm, and which are substantially free of particles above about 12 µm in size. The voiding agent is preferably a flat platelet material such as mica.

WO 2010/039375 A1 relates to a film including at least a first layer having at least one of polypropylene, polypropylene with cavitating agent, and mono-oriented high density polyethylene; said first layer has a density in the range of 0.2 to 0.96 g/cm$^3$ and a thickness in the range of about 0.5 to 80 µm, wherein said film has an impact strength equal to or less than 0.236 cm×kgf/µm. The cavitating agent of the first layer or third layer comprises at least one of polybutylene terephthalate, cyclic olefin copolymers, glass spheres, precipitated calcium carbonate, calcium-magnesium carbonates, dolomite, silicates, barium sulphate, carbon black, slate powder, pearl white, silica, hydrated alumina, kaolin, diatomite, mica, and talcum, said cavitating agent having a particle size of from about 0.5 to about 15 µm.

U.S. Pat. No. 5,876,857 A refers to a coextruded, biaxially oriented film comprising a base layer, which comprises a polypropylene or a polypropylene mixture, and at least one top layer comprising olephinic polymers. The top layer comprises a combination of inorganic and/or organic particles and tertiary aliphatic amine.

U.S. Pat. No. 5,498,474 A refers to a multilayer polypropylene film which comprises a base layer K, an interlayer Z and an outer layer D in the structure KZD. The base layer includes propylene polymer or a propylene polymer mixture and filler. The interlayer includes a propylene polymer or a propylene polymer mixture and pigment. The outer layer is heat-sealable and contains a combination of inorganic and/or organic particles and a tertiary aliphatic amine. U.S. Pat. No. 5,326,625 refers to a sealable, opaque, biaxially orientated multilayer polypropylene film comprising a core layer and (an) intermediate layer(s) located on one or both sides of the core layer and (a) top layer(s) located on one or both sides of the intermediate layer(s) or the core layer, wherein the core layer contains a polypropylene polymer or a polypropylene mixture and calcium carbonate having an average particle diameter of 1 to 2 µm.

Martin Brunner et al., Cavitation and Gloss, Packaging Films 3-2013, pages 6 to 8 refers to biaxially oriented polypropylene films. In particular, it is stated that the optimised mean particle size of calcium carbonate is around 2.5 to 3 microns for obtaining the lowest density of 0.5 g/cm³.

However, there is a continuous need for BOPP films which provide a better performance than existing films and especially for BOPP films providing low density in combination with high opacity.

Thus, the provision of BOPP films providing low density in combination with high opacity remains of interest to the skilled man. In particular, it is desired to provide a BOPP film providing lower density in combination with higher opacity compared to a conventional BOPP film comprising a fine calcium carbonate, i.e. a calcium carbonate having a weight median particle size $d_{50}$ of <3.2 µm. Furthermore, it is desired to keep the mechanical and further optical properties of the BOPP film on a high level.

Accordingly, it is an object of the present invention to provide a biaxially oriented polypropylene (BOPP) film having a low density. It would also be desirable to provide a biaxially oriented polypropylene film or corresponding layer having a density being below the density typically achieved for BOPP films or corresponding layers using calcium carbonate having a weight median particle size $d_{50}$ of 3.2 µm as cavitation agents. Thus, it would be desirable to provide a biaxially oriented polypropylene film or layer having a density of less than 0.72 g/cm³. In addition thereto, it would also be desirable to provide a biaxially oriented polypropylene film or layer having an opaque appearance. In particular, it would be desirable to provide a biaxially oriented polypropylene film or corresponding layer having an opacity being higher than the opacity typically achieved for BOPP films or corresponding layers using calcium carbonate having a weight median particle size $d_{50}$ of <3.2 µm as cavitation agents. It would be also desirable to provide a biaxially oriented polypropylene film or layer having good mechanical and further optical properties.

Another object of the present invention is the provision of an inorganic cavitation agent for biaxially oriented polypropylene films or layers. It would also be desirable to provide an inorganic cavitation agent for biaxially oriented polypropylene films or layers, which shows good dispersing properties and compounding performance in polypropylene film/layer applications. It would also be desirable to provide an inorganic cavitation agent for biaxially oriented polypropylene films or layers, which imparts low density and high opacity to the film or layer. It would also be desirable to provide an inorganic cavitation agent for biaxially oriented polypropylene films or layers, which imparts good mechanical properties such as tensile strength, elongation at break or modulus of elasticity.

The foregoing objects and other objects are solved by the subject-matter as defined herein in the independent claims.

According to one aspect of the present invention, a mono or multi-layer biaxially oriented polypropylene film having a density of ≤0.72 g/cm³ is provided, wherein at least one layer of the film comprises at least one polypropylene in an amount ranging from 79.0 to 95.0 wt.-% and at least one natural calcium carbonate in an amount ranging from 5.0 to 21.0 wt.-%, based on the total weight of the layer, wherein the at least one natural calcium carbonate has a weight median particle size $d_{50}$ from 3.2 µm to 8.0 µm.

According to a further aspect, a process for producing a mono or multi-layer biaxially oriented polypropylene film is provided, the process comprising the steps of:

a) providing a composition comprising at least one polypropylene and at least one natural calcium carbonate, and
b) forming a film from the composition of step a), and
c) stretching the film obtained in step b) in machine direction (MD) and transverse direction (TD) in any order, wherein the stretching in machine direction (MD) and transverse direction (TD) is carried out sequential or simultaneously, wherein the at least one natural calcium carbonate has a weight median particle size $d_{50}$ from 3.2 µm to 8.0 µm.

According to still another aspect of the present invention, a use of at least one natural calcium carbonate as cavitation agent in a mono or multi-layer biaxially oriented polypropylene film having a density of ≤0.72 g/cm³, as defined herein, is provided, wherein the at least one natural calcium carbonate has a weight median particle size $d_{50}$ from 3.2 µm to 8.0 µm.

According to still another aspect of the present invention, an article comprising a mono or multi-layer biaxially oriented polypropylene film, as defined herein, is provided, wherein the article is selected from the group consisting of flower overwrapping, cigarette overwrapping, CD overwrapping, shrinkable films, release films, twist films, mat films, non-electrical capacitor films, food packaging, flexible packaging, candy bar wrappers, hygiene articles, labels, textiles, stationery goods, photo albums, envelopes, windows, catalogues, manuals, packaging bags, maps, audio/video cassettes, industrial tapes, preferably pressure sensitive tapes, box sealing tapes, masking tapes, laminated metallized brochure catalogues, print laminations, carton boxes, cosmetic boxes, restaurant menus, electrical articles, preferably cable insulations and capacitors.

According to still another aspect of the present invention, a use of a mono or multi-layer biaxially oriented polypropylene film, as defined herein, in flower overwrapping, cigarette overwrapping, CD overwrapping, shrinkable films, release films, twist films, mat films, non-electrical capacitor films, food packagings, flexible packagings, candy bar wrappers, hygiene articles, labels, textiles, stationery goods, photo albums, envelopes, windows, catalogues, manuals, packaging bags, maps, audio/video cassettes, industrial tapes, preferably pressure sensitive tapes, box sealing tapes, masking tapes, laminated metallized brochure catalogues, print laminations, carton boxes, cosmetic boxes, restaurant menus, electrical articles, preferably cable insulations and capacitors is provided.

Advantageous embodiments of the present invention are defined herein and also in the corresponding sub-claims.

According to one embodiment of the present invention, the at least one polypropylene and at least one natural calcium carbonate comprising layer of the film comprises a) the at least one polypropylene in an amount ranging from 82.0 to 93.0 wt.-% and preferably from 84.0 to 92.0 wt.-%, based on the total weight of the layer, and/or b) the at least one natural calcium carbonate in an amount ranging from 7.0 to 18.0 wt.-% and preferably from 8.0 to 16.0 wt.-%, based on the total weight of the layer.

According to another embodiment, the at least one polypropylene is selected from the group selected of propylene homopolymers, propylene random copolymers, preferably with ethylene, terpolymers, preferably with ethylene and butene, most preferably the at least one polypropylene is a propylene homopolymer.

According to yet another embodiment, the at least one polypropylene has a) a melt flow rate (MFR) determined according to ISO 1133 (230° C., 2.16 kg) in the range from 0.01 to 20 g/10 min, and most preferably from 0.1 to 10 g/10 min, and/or b) a density determined according to ISO 1183 in the range from 0.880 g/cm³ to 0.920 g/cm³ and most preferably from 0.890 g/cm³ to 0.910 g/cm³.

According to one embodiment, the at least one natural calcium carbonate is a ground natural calcium carbonate, preferably a wet or dry ground natural calcium carbonate and most preferably a dry ground natural calcium carbonate.

According to another embodiment, the at least one natural calcium carbonate is marble and/or limestone and/or chalk.

According to yet another embodiment, the at least one natural calcium carbonate has a) a weight median particle size $d_{50}$ from 3.5 µm to 8.0 µm, more preferably from 3.5 µm to 7.2 µm and most preferably from 4.0 µm to 6.8 µm, and/or b) a top cut particle size $d_{98}$ of ≤50.0 µm preferably of ≤40.0 µm and most preferably of ≤35.0 µm, and/or c) a specific surface area (BET) of from 0.5 to 150 m²/g, preferably of from 0.5 to 50 m²/g, more preferably of from 0.5 to 35 m²/g, and most preferably of from 0.5 to 15 m²/g, as measured using nitrogen and the BET method according to ISO 9277.

According to one embodiment, the at least one natural calcium carbonate is a surface-treated natural calcium carbonate comprising a treatment layer on the surface of the at least one natural calcium carbonate comprising i) a phosphoric acid ester blend of one or more phosphoric acid mono-ester and salty reaction products thereof and/or one or more phosphoric acid di-ester and salty reaction products thereof, and/or ii) at least one saturated aliphatic linear or branched carboxylic acid and salty reaction products thereof, and/or iii) at least one aliphatic aldehyde and/or salty reaction products thereof, and/or iv) at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof, and/or v) at least one polydialkylsiloxane, and/or vi) mixtures of the materials according to i. to v.

According to another embodiment, the treatment layer on the surface of the at least one natural calcium carbonate comprises at least one saturated aliphatic linear or branched carboxylic acid and salty reaction products thereof, preferably the at least one saturated aliphatic linear or branched carboxylic acid is selected from the group consisting of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof, and/or at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof, most preferably the treatment layer on the surface of the at least one natural calcium carbonate comprises stearic acid and salty reaction products thereof.

According to yet another, the surface-treated natural calcium carbonate comprises the treatment layer in an amount of from 0.05 to 2.3 wt.-%, preferably from 0.1 to 2.0 wt.-%, more preferably from 0.1 to 1.9 wt.-% and most preferably from 0.15 to 1.8 wt.-%, based on the total dry weight of the at least one natural calcium carbonate.

According to one embodiment, the at least one polypropylene and natural calcium carbonate comprising layer of the film further comprises at least one additive selected from the group comprising a cavitating agent, especially selected from a polymeric cavitation agent, preferably a thermoplastic polymer, more preferably crosslinked with a crosslinking agent, selected from the group consisting of a polyketone, a polysulphone, a fluoropolymer, preferable polytetrafluoroethylene, a polyacetal, an ionomer, an acrylic resin, preferably polymethylmethacrylate, a polystyrene resin, a polyurethane, a polyamide, a polycarbonate, a polyacrylonitrile, a polyethylene terephthalate, a polybutylene terephthalate, and a copolymerized resin and mixtures thereof, and/or an inorganic cavitation agent, preferably selected from inorganic fillers (different from the at least one natural calcium carbonate), pigments, solid microspheres, hollow microspheres, metals, and mixtures thereof, an antioxidant, an acid scavenger, a processing aid, an antistatic additive, an extrusion aid, a nucleating agent, a light stabilizer, an optical brightener, a blue dye, an antiblocking agent, a white pigment and mixtures thereof, which is/are dispersed in the at least one polypropylene.

According to another embodiment, the at least one polypropylene and at least one natural calcium carbonate comprising layer of the film comprises the at least one additive in an amount ranging from 0.1 to 30.0 wt.-%, preferably from 2.0 to 25.0 wt.-%, more preferably from 4.0 to 22.0 wt.-%, even more preferably from 5.0 to 20.0 wt.-%, still more preferably from 6.0 to 17 wt.-%, and most preferably from 8.0 to 15.0 wt.-%, based on the total weight of the layer.

According to yet another embodiment, the film, preferably the at least one polypropylene and at least one natural calcium carbonate comprising layer of the film, has a) a density of ≤0.70 g/cm³, preferably of ≤0.68 g/cm³, more preferably of ≤0.65 g/cm³, even more preferably in the range from 0.40 to 0.65 g/cm³ and most preferably from 0.50 to 0.65 g/cm³, e.g. in the range between ≥0.4 and <0.62 g/cm³, and/or b) an opacity of ≥40%, preferably of ≥55%, even more preferably of ≥60% and most preferably of ≥65%.

According to one embodiment of the process, the composition provided in step a) is a masterbatch obtained by mixing and/or kneading the at least one polypropylene and at least one natural calcium carbonate to form a mixture and continuously pelletizing the obtained mixture.

According to another embodiment of the process, the composition provided in step a) is a masterbatch comprising the at least one natural calcium carbonate in an amount between >30 and 85 wt.-%, preferably from 35 to 80 wt.-% and more preferably from 40 to 75 wt.-%, based on the total weight of the masterbatch.

According to another embodiment of the process, the composition provided in step a) is a compound obtained by mixing and/or kneading the at least one polypropylene and at least one natural calcium carbonate to form a mixture and continuously pelletizing the obtained mixture.

According to still another embodiment of the process, process steps a) and b) are carried out simultaneously, preferably in that the at least one polypropylene and the at least one natural calcium carbonate are added directly into an extruder to carry out step b).

According to one embodiment of the process, the composition comprising at least one polypropylene and at least one natural calcium carbonate of step a) is obtained by adding the at least one natural calcium carbonate, preferably before or after, to the polymerization process of the at least one polypropylene.

The at least one polypropylene and the at least one calcium carbonate, and, if present, other optional additives, may be mixed by the use of a suitable mixer, e.g. a Henschel mixer, a super mixer, a tumbler type mixer or the like. According to another embodiment, process steps a) and b) are carried out simultaneously, preferably in that the at least one polypropylene and the at least one calcium carbonate are added directly into an extruder to carry out step b). According to yet another embodiment, the composition comprising at least one polypropylene and at least one calcium carbonate of step a) is obtained by adding the at least one calcium carbonate, preferably before or after, to the polymerization process of the at least one polypropylene.

It should be understood that for the purposes of the present invention, the following terms have the following meanings:

The term "biaxially oriented" polypropylene film indicates that the film is a biaxially oriented film, i.e. the film has been subjected to a stretching process in machine direction (MD) and transverse direction (TD) obtaining thereby a biaxially oriented polymer.

A "film" in the meaning of the present invention is a sheet or layer of material having a median thickness which is small compared to its length and width. For example, the term "film" may refer to a sheet or layer of material having a median thickness of from 3.2 to 500 µm, preferably from 4 to 400 µm, more preferably from 5 to 300 µm and most preferably from 6 to 250 µm, e.g. from 8 to 150 µm. The film is in the form of a mono or multi-layer film.

A "monolayer" film refers to a film consisting of one layer only. A "multi-layer" film refers to a film consisting of two or more layers such as two to ten layers, preferably three layers, which are adjacent to each other. If the multi-layer film is a three layer film, the film may have the film structure A-B-A or A-B-C. In the multi-layer film, the core layer is preferably voided.

The term "natural calcium carbonate" in the gist of the present invention refers to a naturally occurring form of calcium carbonate, mined from sedimentary rocks such as limestone or chalk, or from metamorphic marble rocks and processed through a treatment such as grinding, screening and/or fractionizing in dry or wet form, for example by a cyclone or classifier. In one embodiment of the present invention, the natural calcium carbonate is selected from the group comprising marble, chalk, limestone and mixtures thereof.

The term "low density" in the meaning of the present invention refers to a mono or multi-layer biaxially oriented polypropylene film or a corresponding layer having a density of $\leq 0.72$ g/cm$^3$, preferably of $\leq 0.70$ g/cm$^3$, more preferably of $\leq 0.68$ g/cm$^3$, still more preferably of $\leq 0.65$ g/cm$^3$, even more preferably in the range from 0.40 to 0.65 g/cm$^3$ and most preferably from 0.50 to 0.65 g/cm$^3$, e.g. in the range between $\geq 0.4$ and $<0.62$ g/cm$^3$.

For the purpose of the present invention, the term "high opacity" refers to a mono or multi-layer biaxially oriented polypropylene film or a corresponding layer having an opacity of $\geq 40\%$, preferably of $\geq 55\%$, even more preferably of $\geq 60\%$ and most preferably of $\geq 65\%$.

The term "polymer composition" refers to a composite material comprising at least one additive (e.g., at least one filler) and at least one polypropylene material which may be used in the production of a polymer product.

The term "polymer masterbach" (= or "masterbatch") relates to a composition with a relative high filler content, preferably at least or equal to 30 wt.-% (based on the total weight of the composition). A "polymer masterbatch" may be added to an unfilled or lowly filled polypropylene during processing in order to achieve higher filler contents. Nevertheless, a "polymer composition" (= or "composition") as defined earlier having a relative low filler content, preferably below 30 wt.-% (based on the total weight of the composition), and which often also referred to as a "polymer compound" (= or "compound"), may also be used directly in the production of a polymer product. Accordingly, the term "polymer composition" (=composition) as used herein comprises both, "polymer masterbatches" and "polymer compounds".

The term "specific surface area" (in m$^2$/g) of the calcium carbonate in the meaning of the present invention is determined using the BET method with nitrogen as adsorbing gas, which is well known to the skilled man (ISO 9277: 2010). The total surface area (in m$^2$) of the calcium carbonate is then obtained by multiplying the specific surface area by the mass (in g) of the calcium carbonate prior to treatment.

Throughout the present document, the "particle size" of a calcium carbonate is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are smaller than this particle size whilst the remaining 50 wt.-% are smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used. The method and the instrument are known to the skilled person and are commonly used to determine grain size of fillers and pigments. The measurement is carried out in an aqueous solution of 0.1 wt.-% $Na_4P_2O_7$. The samples are dispersed using a high speed stirrer and supersonics.

For the purpose of the present invention, the "solids content" of a liquid composition is a measure of the amount of material remaining after all the solvent or water has been evaporated.

A "suspension" or "slurry" in the meaning of the present invention comprises insoluble solids and water, and optionally further additives, and usually contains large amounts of solids and, thus, is more viscous and can be of higher density than the liquid from which it is formed.

A "treatment layer" in the gist of the present invention refers to a layer, preferably a monolayer of a surface treatment agent on the surface of the at least one natural calcium carbonate. The "treatment layer" comprises as surface treatment agent i.e. i. a phosphoric acid ester blend of one or more phosphoric acid mono-ester and salty reaction products thereof and/or one or more phosphoric acid di-ester and salty reaction products thereof, and/or ii. at least one saturated aliphatic linear or branched carboxylic acid and salty reaction products thereof, and/or iii. at least one aliphatic aldehyde and/or salty reaction products thereof, and/or iv. at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof, and/or v. at least one polydialkylsiloxane, and/or vi. mixtures of the materials according to i. to v.

Where the term "comprising" is used in the present description and claims, it does not exclude other non-specified elements of major or minor functional importance.

For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

The inventive mono or multi-layer biaxially oriented polypropylene film has a density of ≤0.72 g/cm$^3$. The film comprises at least one layer comprising at least one polypropylene in an amount ranging from 79.0 to 95.0 wt.-% and at least one natural calcium carbonate in an amount ranging from 5.0 to 21.0 wt.-%, based on the total weight of the layer. The at least one natural calcium carbonate has a weight median particle size $d_{50}$ from 3.2 μm to 8.0 μm.

In the following details and preferred embodiments of the inventive product will be set out in more detail. It is to be understood that these technical details and embodiments also apply to the inventive process for producing said mono or multi-layer biaxially oriented polypropylene film and the inventive use of the mono or multi-layer biaxially oriented polypropylene film and the at least one natural calcium carbonate.

Polypropylene

The mono or multi-layer biaxially oriented polypropylene film of the present invention comprises at least one layer comprising at least one polypropylene. It is appreciated that the at least one polypropylene is not restricted to a specific material as long as the polymer is suitable for the preparation of a mono or multi-layer biaxially oriented polypropylene film. The skilled person will select the polypropylene in accordance with the desired application of the mono or multi-layer biaxially oriented polypropylene film.

It is one requirement of the present invention that the at least one polypropylene and the at least one natural calcium carbonate are present in the same layer. Thus, the at least one natural calcium carbonate is dispersed in the at least one polypropylene.

Accordingly, a multi-layer biaxially oriented polypropylene film comprises at least one layer comprising the at least one polypropylene and the at least one natural calcium carbonate. If the multi-layer biaxially oriented polypropylene film comprises two or more polypropylene and at least one natural calcium carbonate comprising layers, it is appreciated that the two or more layers may be the same or different, e.g. may differ in the kind or amounts of the at least one polypropylene and the at least one natural calcium carbonate.

It is appreciated that the expression "at least one" polypropylene means that the polypropylene comprises, preferably consists of, one or more kinds of polypropylene(s).

Accordingly, it should be noted that the at least one polypropylene may be one kind of polypropylene. Alternatively, the at least one polypropylene may be a mixture of two or more kinds of polypropylenes. For example, the at least one polypropylene may be a mixture of two or three kinds of polypropylene, like two kinds of polypropylene.

In one embodiment of the present invention, the at least one polypropylene comprises, preferably consists of, one kind of polypropylene.

In general, the term "polypropylene" refers to propylene homopolymers, propylene random copolymers and/or terpolymers.

The expression "propylene homopolymer" relates to a polypropylene that consists substantially, i.e. of at least 99.0 wt.-%, more preferably of at least 99.5 wt.-%, of propylene units. It is appreciated that the propylene homopolymer may comprise ethylene units in an amount of up to 0.90 wt.-%, preferably up to 0.50 wt.-%, more preferably in the range of 0.20 to 0.50 wt.-%.

If the polypropylene is a propylene random copolymer, it comprises monomers copolymerizable with propylene, i.e. α-olefins other than propylene, for example comonomers such as ethylene or $C_4$ to $C_{10}$ α-olefins. Preferably the propylene random copolymer comprises, especially consists of, monomers copolymerizable with propylene from the group consisting of ethylene, 1-butene and 1-hexene. More preferably, the propylene random copolymer comprises units derivable from ethylene and propylene only.

The comonomer content in the propylene random copolymer is preferably below 30.0 wt.-% or more preferably equal or below 25.0 wt.-%. For example, the comonomer content is preferably from 1.0 to 30.0 wt.-%, more preferably in the range of above 1.5 to 25.0 wt.-% and even more preferably in the range of 2.0 to 20.0 wt.-%, and most preferably 7.5 to 15.0 wt.-%, based on the total weight of the propylene random copolymer.

If the polypropylene is a terpolymer, it comprises two different monomers copolymerizable with propylene, i.e. α-olefins other than propylene, for example comonomers such as ethylene and/or $C_4$ to $C_{10}$ α-olefins. Preferably, the terpolymer comprises, especially consists of, two monomers copolymerizable with propylene from the group consisting of ethylene, 1-butene, 1-hexene and 1-octene. More preferably, the terpolymer comprises units derivable from ethylene, 1-butene and propylene only.

It is appreciated that the at least one polyproyplene is preferably a propylene homopolymer.

According to one embodiment, the at least one polypropylene, preferably propylene homopolymer, has a density determined according to ISO 1183 in the range from 0.880 g/cm$^3$ to 0.920 g/cm$^3$ and most preferably from 0.890 g/cm$^3$ to 0.910 g/cm$^3$.

Additionally or alternatively, the melt flow rate (MFR) determined according to ISO 1133 (230° C., 2.16 kg) of the at least one polypropylene, preferably propylene homopolymer, is preferably in the range from 0.01 to 20 g/10 min, and most preferably from 0.1 to 10 g/10 min.

In one embodiment, the at least one polypropylene, preferably propylene homopolymer, has a density determined according to ISO 1183 in the range from 0.880 g/cm$^3$ to 0.920 g/cm$^3$ and most preferably from 0.890 g/cm$^3$ to 0.910 g/cm$^3$ and a melt flow rate (MFR) determined according to ISO 1133 (230° C., 2.16 kg) in the range from 0.01 to 20 g/10 min, and most preferably from 0.1 to 10 g/10 min.

Alternatively, the at least one polypropylene, preferably propylene homopolymer, has a density determined according to ISO 1183 in the range from 0.880 g/cm$^3$ to 0.920 g/cm$^3$ and most preferably from 0.890 g/cm$^3$ to 0.910 g/cm$^3$ and a melt flow rate (MFR) determined according to ISO 1133 (230° C., 2.16 kg) in the range from 0.01 to 20 g/10 min, and most preferably from 0.1 to 10 g/10 min.

It is one requirement of the present invention that the at least one polypropylene and at least one natural calcium carbonate comprising layer of the mono or multi-layer biaxially oriented polypropylene film comprises the at least one polypropylene in an amount ranging from 79.0 to 95.0 wt.-%, based on the total weight of the layer.

According to one embodiment, the at least one polypropylene and at least one natural calcium carbonate comprising layer of the film comprises the at least one polypropylene in an amount ranging from 82.0 to 93.0 wt.-% and preferably from 84.0 to 92.0 wt.-%, based on the total weight of the layer.

Natural Calcium Carbonate

The at least one layer of the mono or multi-layer biaxially oriented polypropylene film of the present invention also comprises at least one natural calcium carbonate.

The at least one natural calcium carbonate is preferably a ground natural calcium carbonate. More precisely, the at least one natural calcium carbonate, preferably ground natural calcium carbonate, is a wet or dry ground natural calcium carbonate. Preferably, the at least one natural calcium carbonate, preferably ground natural calcium carbonate, is a dry ground natural calcium carbonate.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill an attrition mill, a pin mill, a hammer mill, a pulverizer, a shredder, a de-clumper, a knife cutter, or other such equipment known to the skilled man.

In case the at least one natural calcium carbonate is a wet ground natural calcium carbonate, the wet grinding step may be performed under conditions such that autogenous grinding takes place and/or by horizontal ball milling, and/or other such processes known to the skilled man. The processed ground natural calcium carbonate thus obtained may be washed and dewatered by well-known processes, e.g. by flocculation, filtration or forced evaporation prior to drying. The subsequent step of drying may be carried out in a single step such as spray drying, or in at least two steps, e.g. by applying a first heating step to the wet ground natural calcium carbonate in order to reduce the associated moisture content to a level which is not greater than about 0.5 wt.-%, based on the total dry weight of the at least one wet ground natural calcium carbonate. The residual total moisture content of the calcium carbonate can be measured by the Karl Fischer Coulometric titration method, desorbing the moisture in an oven at 195° C. and passing it continuously into the KF Coulometer (Mettler Toledo Coulometric KF Titrator C30, combined with Mettler oven DO 0337) using dry $N_2$ at 100 ml/min for 10 min. The residual total moisture content can be determined with a calibration curve and also a blind of 10 min gas flow without a sample can be taken into account. The residual total moisture content may be further reduced by applying a second heating step to the at least one wet ground natural calcium carbonate. In case said drying is carried out by more than one drying steps, the first step may be carried out by heating in a hot current of air, while the second and further drying steps are preferably carried out by an indirect heating in which the atmosphere in the corresponding vessel comprises a surface treatment agent. It is also common that the at least one wet ground natural calcium carbonate is subjected to a beneficiation step (such as a flotation, bleaching or magnetic separation step) to remove impurities.

In another preferred embodiment, the at least one ground natural calcium carbonate is a material being ground in a horizontal ball mill, and subsequently dried by using the well-known process of spray drying.

The at least one natural calcium carbonate in the meaning of the present invention is preferably a ground natural calcium carbonate, more preferably the at least one natural calcium carbonate is a dry ground natural calcium carbonate.

The natural calcium carbonate is understood to be a naturally occurring form of calcium carbonate, mined from sedimentary rocks such as limestone or chalk, or from metamorphic marble rocks and processed through a treatment such as grinding, screening and/or fractionizing in wet form, for example by a cyclone or classifier. In one embodiment of the present invention, the at least one natural calcium carbonate is marble and/or limestone and/or chalk. Preferably, the at least one natural calcium carbonate is marble and/or limestone.

In one preferred embodiment, the at least one natural calcium carbonate is marble, more preferably a dry ground marble.

It is appreciated that the amount of calcium carbonate in the at least one natural calcium carbonate is at least 50 wt.-%, preferably at least 80 wt.-% and most preferably at least 95 wt.-%, based on the total dry weight of the at least one natural calcium carbonate. For example, the amount of calcium carbonate in the at least one natural calcium carbonate is between 97 and 100 wt.-%, and more preferably between 98.50 and 99.95 wt.-%, based on the total dry weight of the at least one natural calcium carbonate.

The at least one natural calcium carbonate is preferably in the form of a particulate material, and has a median particle size being larger than conventionally employed in mono or multi-layer biaxially oriented polypropylene films. It has been surprisingly found out that a calcium carbonate of large particle size results in a specifically low density in combination with a high opacity. Furthermore, such a coarse calcium carbonate is advantageous, compared to a finer calcium carbonate, as less energy is needed for its production. It is thus one specific requirement of the present invention that the at least one natural calcium carbonate has a weight median particle size $d_{50}$ from 3.2 μm to 8.0 μm.

For example, the at least one natural calcium carbonate has weight median particle size $d_{50}$ from 3.5 μm to 8.0 μm, more preferably from 3.5 μm to 7.2 μm and most preferably from 4.0 μm to 6.8 μm. In one embodiment, the at least one natural calcium carbonate has a weight median particle size $d_{50}$ from 3.5 μm to 6.8 μm, preferably from 4.0 μm to 6.8 μm and most preferably from 4.5 μm to 6.8 μm.

It is preferred that the at least one natural calcium carbonate has a top cut particle size ($d_{98}$) of ≤50.0 μm preferably of ≤40.0 μm and most preferably of ≤35.0 μm.

In one embodiment, the weight median particle size $d_{50}$ value and the top cut ($d_{98}$) of the at least one natural calcium carbonate fulfil a specific ratio. For example, the at least one natural calcium carbonate has a ratio of weight median particle size $d_{50}$ value and the top cut ($d_{98}$) [$d_{50}/d_{98}$] of from 0.1 to 0.27, preferably from 0.12 to 0.27 and most preferably from 0.14 to 0.27.

In one embodiment, the at least one natural calcium carbonate has
i) a weight median particle size $d_{50}$ from 3.2 µm to 8.0 µm, preferably from 3.5 µm to 8.0 µm, more preferably from 3.5 µm to 7.2 µm and most preferably from 4.0 µm to 6.8 µm, and
ii) atop cut particle size $d_{98}$ of ≤50.0 µm preferably of ≤40.0 µm and most preferably of ≤35.0 µm.

For example, the at least one natural calcium carbonate has
i) a weight median particle size $d_{50}$ from 4.0 µm to 6.8 µm, and
ii) a top cut particle size $d_{98}$ of ≤35.0 µm.

In one embodiment, the at least one natural calcium carbonate has
i) a weight median particle size $d_{50}$ from 3.5 µm to 6.8 µm, preferably from 4.0 µm to 6.8 µm and most preferably from 4.5 µm to 6.8 µm, and
ii) atop cut particle size $d_{98}$ of ≤50.0 µm preferably of ≤40.0 µm and most preferably of ≤35.0 µm.

For example, the at least one natural calcium carbonate has
i) a weight median particle size $d_{50}$ from 4.5 µm to 6.8 µm, and
ii) a top cut particle size $d_{98}$ of ≤35.0 µm.

It is preferred that the at least one natural calcium carbonate has a BET specific surface area of from 0.5 to 150 m²/g, preferably of from 0.5 to 50 m²/g, more preferably of from 0.5 to 35 m²/g, and most preferably of from 0.5 to 15 m²/g, as measured using nitrogen and the BET method according to ISO 9277.

In one embodiment of the present invention, the at least one natural calcium carbonate is preferably a marble having a weight median particle size $d_{50}$ from 3.2 µm to 8.0 µm, preferably from 3.5 µm to 8.0 µm, more preferably from 3.5 m to 7.2 µm and most preferably from 4.0 µm to 6.8 µm. In this case, the marble preferably has a BET specific surface area of from 0.5 to 150 m²/g, preferably of from 0.5 to 50 m²/g, more preferably of from 0.5 to 35 m²/g, and most preferably of from 0.5 to 15 m²/g, as measured using nitrogen and the BET method according to ISO 9277. Additionally or alternatively, the marble preferably has a top cut particle size $d_{98}$ of ≤50.0 µm preferably of ≤40.0 µm and most preferably of ≤35.0 µm.

In an alternative embodiment of the present invention, the at least one natural calcium carbonate is preferably a marble having a weight median particle size $d_{50}$ from 3.5 µm to 6.8 m, preferably from 4.0 µm to 6.8 µm and most preferably from 4.5 µm to 6.8 µm. In this case, the marble preferably has a BET specific surface area of from 0.5 to 150 m²/g, preferably of from 0.5 to 50 m²/g, more preferably of from 0.5 to 35 m²/g, and most preferably of from 0.5 to 15 m²/g, as measured using nitrogen and the BET method according to ISO 9277. Additionally or alternatively, the marble preferably has a top cut particle size $d_{98}$ of ≤50.0 µm preferably of ≤40.0 µm and most preferably of ≤35.0 µm.

According to the present invention the at least one natural calcium carbonate has a residual moisture content of ≤1 wt.-%, based on the total dry weight of the at least one natural calcium carbonate. Depending on the at least one natural calcium carbonate, the at least one natural calcium carbonate has a residual total moisture content of from 0.01 to 1 wt.-%, preferably from 0.01 to 0.2 wt.-%, more preferably from 0.02 to 0.15 wt.-% and most preferably from 0.04 to 0.15 wt.-%, based on the total dry weight of the at least one natural calcium carbonate.

For example, in case a ground and spray dried marble is used as the at least one natural calcium carbonate, the residual total moisture content of the at least one natural calcium carbonate is preferably of from 0.01 to 0.1 wt.-%, more preferably from 0.02 to 0.08 wt.-% and most preferably from 0.04 to 0.07 wt.-% based on the total dry weight of the at least one natural calcium carbonate.

It is appreciated that the at least one natural calcium carbonate can be a surface-treated or untreated natural calcium carbonate.

As the inventors surprisingly found out that the density of the BOPP film can be further decreased and the opacity of the film can be further increased if the at least one natural calcium carbonate is a surface-treated natural calcium carbonate, compared to the untreated natural calcium carbonate, it is preferred that the mono or multi-layer biaxially oriented polypropylene film of the present invention preferably comprises a surface-treated natural calcium carbonate.

Thus, according to one embodiment, the at least one natural calcium carbonate is a surface-treated natural calcium carbonate.

It is appreciated that the surface-treated natural calcium carbonate further comprises a treatment layer on the surface of the at least one natural calcium carbonate.

The treatment layer comprises
i. a phosphoric acid ester blend of one or more phosphoric acid mono-ester and salty reaction products thereof and/or one or more phosphoric acid di-ester and salty reaction products thereof, and/or
ii. at least one saturated aliphatic linear or branched carboxylic acid and salty reaction products thereof, and/or
iii. at least one aliphatic aldehyde and/or salty reaction products thereof, and/or
iv. at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof, and/or
v. at least one polydialkylsiloxane, and/or
vi. mixtures of the materials according to i. to v.

According to one embodiment of the present invention, the surface-treated natural calcium carbonate comprises a treatment layer on at least a part of the surface of the at least one natural calcium carbonate, wherein the treatment layer comprises a phosphoric acid ester blend of one or more phosphoric acid mono-ester and salty reaction products thereof and/or one or more phosphoric acid di-ester and salty reaction products thereof.

The term "phosphoric acid mono-ester" in the meaning of the present invention refers to an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20, and most preferably from C8 to C18 in the alcohol substituent.

The term "phosphoric acid di-ester" in the meaning of the present invention refers to an o-phosphoric acid molecule di-esterified with two alcohol molecules selected from the same or different, unsaturated or saturated, branched or linear, aliphatic or aromatic alcohols having a total amount of carbon atoms from C6 to C30, preferably from C8 to C22, more preferably from C8 to C20, and most preferably from C8 to C18 in the alcohol substituent.

The term "salty reaction products of a phosphoric acid ester blend of one or more phosphoric acid mono-esters and/or one or more phosphoric acid di-esters" in the meaning of the present invention refers to products obtained by contacting a natural calcium carbonate with one or more phosphoric acid mono-ester and one or more phosphoric acid di-ester and optionally phosphoric acid. Said salty reaction products are formed between the applied one or more phosphoric acid mono-ester and one or more phosphoric acid di-ester and optionally phosphoric acid and reactive molecules located at the surface of the natural calcium carbonate.

Alkyl esters of phosphoric acid are well known in the industry especially as surfactants, lubricants and antistatic agents (Die Tenside; Kosswig und Stache, Carl Hanser Verlag Mtinchen, 1993).

The synthesis of alkyl esters of phosphoric acid by different methods and the surface treatment of minerals with alkyl esters of phosphoric acid are well known by the skilled man, e.g. from Pesticide Formulations and Application Systems: 15$^{th}$ Volume; Collins H M, Hall F R, Hopkinson M, STP1268; Published: 1996, U.S. Pat. Nos. 3,897,519 A, 4,921,990 A, 4,350,645 A, 6,710,199 B2, 4,126,650 A, 5,554,781 A, EP 1092000 B1 and WO 2008/023076 A1.

It is appreciated that the expression "one or more" phosphoric acid mono-ester means that one or more kinds of phosphoric acid mono-ester may be present in the phosphoric acid ester blend.

Accordingly, it should be noted that the one or more phosphoric acid mono-ester may be one kind of phosphoric acid mono-ester. Alternatively, the one or more phosphoric acid mono-ester may be a mixture of two or more kinds of phosphoric acid mono-ester. For example, the one or more phosphoric acid mono-ester may be a mixture of two or three kinds of phosphoric acid mono-ester, like two kinds of phosphoric acid mono-ester.

In one embodiment of the present invention, the one or more phosphoric acid mono-ester consists of an o-phosphoric acid molecule esterified with one alcohol selected from unsaturated or saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from unsaturated or saturated, branched or linear, aliphatic or aromatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear or branched and aliphatic alcohols having a total amount of carbon atoms from C6 to C30 in the alcohol substituent. For example, the one or more phosphoric acid mono-ester consists of an o-phosphoric acid molecule esterified with one alcohol selected from saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester consists of an o-phosphoric acid molecule esterified with one alcohol selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid mono-ester consists of an o-phosphoric acid molecule esterified with one alcohol selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the treatment layer of the surface-treated natural calcium carbonate and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from unsaturated or saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from unsaturated or saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different, unsaturated or saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear or branched and aliphatic alcohols having a total amount of carbon atoms from C6 to C30 in the alcohol substituent. For example, the one or more phosphoric acid di-ester consists of an o-phosphoric acid molecule esterified with two alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, at least a part of the surface of the at least one natural calcium carbonate comprises a phosphoric acid ester blend of one phosphoric acid mono-ester and salty reaction products thereof and one phosphoric acid di-ester and salty reaction products thereof. In this case, the one phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester and 2-octyl-1-dodecylphosphoric acid mono-ester, the one phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester and 2-octyl-1-dodecylphosphoric acid di-ester.

If at least a part of the surface of the at least one natural calcium carbonate comprises a phosphoric acid ester blend of one phosphoric acid mono-ester and salty reaction products thereof and one phosphoric acid di-ester and salty reaction products thereof, it is appreciated that the alcohol substituent of the one phosphoric acid mono-ester and the one phosphoric acid di-ester are preferably the same. For example, at least a part of the surface of the at least one natural calcium carbonate comprises a phosphoric acid ester blend of 2-ethylhexyl phosphoric acid mono-ester and salty reaction products thereof and 2-ethylhexyl phosphoric acid di-ester and salty reaction products thereof. Alternatively, at least a part of the surface of the at least one natural calcium carbonate comprises a phosphoric acid ester blend of 2-octyl-1-decyl phosphoric acid mono-ester and salty reaction products thereof and 2-octyl-1-decyl phosphoric acid di-ester and salty reaction products thereof. Alternatively, at least a part of the surface of the at least one natural calcium carbonate comprises a phosphoric acid ester blend of hexadecyl phosphoric acid mono-ester and salty reaction products thereof and hexadecyl phosphoric acid di-ester and salty reaction products thereof. Alternatively, at least a part of the surface of the at least one natural calcium carbonate comprises a phosphoric acid ester blend of octadecyl phosphoric acid mono-ester and salty reaction products thereof and octadecyl phosphoric acid di-ester and salty reaction products thereof. Alternatively, at least a part of the surface of the at least one natural calcium carbonate comprises a phosphoric acid ester blend of 2-octyl-1-dodecylphosphoric acid mono-ester and salty reaction products thereof and 2-octyl-1-dodecylphosphoric acid di-ester and salty reaction products thereof.

In one embodiment of the present invention, at least a part of the surface of the at least one natural calcium carbonate comprises a phosphoric acid ester blend of two or more phosphoric acid mono-esters and salty reaction products thereof and two or more phosphoric acid di-ester and salty reaction products thereof. In this case, the two or more phosphoric acid mono-esters are selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decyl phosphoric acid mono-ester and 2-octyl-1-dodecylphosphoric acid mono-ester, the two or more phosphoric acid di-ester are selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decyl phosphoric acid di-ester and 2-octyl-1-dodecylphosphoric acid di-ester.

In one embodiment of the present invention, at least a part of the surface of the at least one natural calcium carbonate comprises a phosphoric acid ester blend of two phosphoric acid mono-esters and salty reaction products thereof and two phosphoric acid di-esters and salty reaction products thereof. For example, at least a part of the surface of the at least one natural calcium carbonate comprises a phosphoric acid ester blend of hexadecyl phosphoric acid mono-ester, octadecyl phosphoric acid mono-ester, hexadecyl phosphoric acid di-ester, octadecyl phosphoric acid di-ester and salty reaction products thereof and salty reaction products thereof.

According to one embodiment of the present invention, the phosphoric acid ester blend on at least a part of the surface of the at least one natural calcium carbonate comprises the one or more phosphoric acid mono-ester and salty reaction products thereof to the one or more phosphoric acid di-ester and salty reaction products thereof in a specific molar ratio. In particular, the molar ratio of the one or more phosphoric acid mono-ester and salty reaction products thereof to the one or more phosphoric acid di-ester and salty reaction products thereof in the treatment layer and/or the phosphoric acid ester blend can be from 1:1 to 1:100.

The wording "molar ratio of the one or more phosphoric acid mono-ester and salty reaction products thereof to the one or more phosphoric acid di-ester and salty reaction products thereof" in the meaning of the present invention refers to the sum of the molecular weight of the phosphoric acid mono-ester molecules and the sum of the molecular weight of the phosphoric acid mono-ester molecules in the salty reaction products thereof to the sum of the molecular weight of the phosphoric acid di-ester molecules and the sum of the molecular weight of the phosphoric acid di-ester molecules in the salty reaction products thereof.

According to one embodiment the molar ratio of the one or more phosphoric acid mono-ester and salty reaction products thereof to the one or more phosphoric acid di-ester and salty reaction products thereof in the phosphoric acid ester blend is from 1:1 to 1:100, preferably from 1:1.1 to 1:80, more preferably from 1:1.1 to 1:60, even more preferably from 1:1.1 to 1:40, still even more preferably from 1:1.1 to 1:20, and most preferably from 1:1.1 to 1:10.

Additionally or alternatively, the phosphoric acid ester blend of the treatment layer comprises the one or more phosphoric acid mono-ester and salty reaction products thereof in an amount of from 1 to 50 mol.-%, based on the molar sum of the one or more phosphoric acid mono-ester and salty reaction products thereof and the one or more phosphoric acid di-ester and salty reaction products thereof. For example, the phosphoric acid ester blend of the treatment layer comprises the one or more phosphoric acid mono-ester and salty reaction products thereof in an amount of from 10 to 45 mol.-%, based on the molar sum of the one or more phosphoric acid mono-ester and salty reaction products thereof and the one or more phosphoric acid di-ester and salty reaction products thereof.

According to one embodiment of the present invention,
I) the one or more phosphoric acid mono-ester consists of an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20, and most preferably from C8 to C18 in the alcohol substituent, and/or
II) the one or more phosphoric acid di-ester consists of an o-phosphoric acid molecule di-esterified with two alcohol molecules selected from the same or different, unsaturated or saturated, branched or linear, aliphatic or aromatic fatty alcohols having a total amount of carbon atoms from C6 to C30, preferably from C8 to C22, more preferably from C8 to C20, and most preferably from C8 to C18 in the alcohol substituent.

In one embodiment of the present invention, the phosphoric acid ester blend of the treatment layer further comprises one or more phosphoric acid tri-ester and/or phosphoric acid and salty reaction products thereof.

The term "phosphoric acid tri-ester" in the meaning of the present invention refers to an o-phosphoric acid molecule tri-esterified with three alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid tri-ester means that one or more kinds of phosphoric acid tri-ester may be present on at least a part of the surface of the at least one natural calcium carbonate.

Accordingly, it should be noted that the one or more phosphoric acid tri-ester may be one kind of phosphoric acid tri-ester. Alternatively, the one or more phosphoric acid tri-ester may be a mixture of two or more kinds of phosphoric acid tri-ester. For example, the one or more phosphoric acid tri-ester may be a mixture of two or three kinds of phosphoric acid tri-ester, like two kinds of phosphoric acid tri-ester.

In one embodiment of the present invention, the one or more phosphoric acid tri-ester consists of an o-phosphoric acid molecule esterified with three alcohols selected from the same or different, unsaturated or saturated, branched or linear, aliphatic or aromatic alcohols having a total amount of carbon atoms from C6 to C30 in the alcohol substituent. For example, the one or more phosphoric acid tri-ester consists of an o-phosphoric acid molecule esterified with three alcohols selected from the same or different, unsaturated or saturated, branched or linear, aliphatic or aromatic fatty alcohols having a total amount of carbon atoms from C8 to C22, more preferably from C8 to C20 and most preferably from C8 to C18 in the alcohol substituent.

It is appreciated that the three alcohols used for esterifying the phosphoric acid may be independently selected from unsaturated or saturated, branched or linear, aliphatic or aromatic alcohols having a total amount of carbon atoms from C6 to C30 in the alcohol substituent. In other words, the one or more phosphoric acid tri-ester molecule may comprise three substituents being derived from the same alcohols or the phosphoric acid tri-ester molecule may comprise three substituents being derived from different alcohols.

In one embodiment of the present invention, the one or more phosphoric acid tri-ester consists of an o-phosphoric acid molecule esterified with three alcohols selected from the same or different, saturated and linear or branched and aliphatic alcohols having a total amount of carbon atoms from C6 to C30 in the alcohol substituent. For example, the one or more phosphoric acid tri-ester consists of an o-phosphoric acid molecule esterified with three alcohols selected from the same or different, saturated and linear or branched and aliphatic alcohols having a total amount of carbon atoms from C8 to C22, more preferably from C8 to C20 and most preferably from C8 to C18 in the alcohol substituent.

In one embodiment of the present invention, the one or more phosphoric acid tri-ester consists of an o-phosphoric acid molecule esterified with three alcohols selected from saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid tri-ester consists of an o-phosphoric acid molecule esterified with three alcohols selected from saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid tri-ester is selected from the group comprising hexyl phosphoric acid tri-ester, heptyl phosphoric acid tri-ester, octyl phosphoric acid tri-ester, 2-ethylhexyl phosphoric acid tri-ester, nonyl phosphoric acid tri-ester, decyl phosphoric acid tri-ester, undecyl phosphoric acid tri-ester, dodecyl phosphoric acid tri-ester, tetradecyl phosphoric acid tri-ester, hexadecyl phosphoric acid tri-ester, heptylnonyl phosphoric acid tri-ester, octadecyl phosphoric acid tri-ester, 2-octyl-1-decylphosphoric acid tri-ester, 2-octyl-1-dodecylphosphoric acid tri-ester and mixtures thereof.

For example, the one or more phosphoric acid tri-ester is selected from the group comprising 2-ethylhexyl phosphoric acid tri-ester, hexadecyl phosphoric acid tri-ester, heptylnonyl phosphoric acid tri-ester, octadecyl phosphoric acid tri-ester, 2-octyl-1-decylphosphoric acid tri-ester, 2-octyl-1-dodecylphosphoric acid tri-ester and mixtures thereof.

In one embodiment of the present invention, at least a part of the surface of the at least one natural calcium carbonate comprises a phosphoric acid ester blend of one or more phosphoric acid mono-ester and salty reaction products thereof and one or more phosphoric acid di-ester and salty reaction products thereof and one or more phosphoric acid tri-ester and optionally phosphoric acid and salty reaction products thereof. For example, at least a part of the surface of the at least one natural calcium carbonate comprises a phosphoric acid ester blend of the one or more phosphoric acid mono-ester and salty reaction products thereof and one or more phosphoric acid di-ester and salty reaction products thereof and one or more phosphoric acid tri-ester and phosphoric acid and salty reaction products thereof.

Alternatively, at least a part of the surface of the at least one natural calcium carbonate comprises a phosphoric acid ester blend of the one or more phosphoric acid mono-ester and salty reaction products thereof and one or more phosphoric acid di-ester and salty reaction products thereof and optionally phosphoric acid and salty reaction products thereof. For example, at least a part of the surface of the at least one natural calcium carbonate comprises a phosphoric acid ester blend of the one or more phosphoric acid mono-ester and salty reaction products thereof and one or more phosphoric acid di-ester and salty reaction products thereof and phosphoric acid and salty reaction products thereof.

If at least a part of the surface of the at least one natural calcium carbonate comprises a phosphoric acid ester blend comprising one or more phosphoric acid tri-ester, it is preferred that the phosphoric acid ester blend comprises the one or more phosphoric acid tri-ester in an amount of ≤10 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof.

For example, the phosphoric acid ester blend comprises the one or more phosphoric acid tri-ester in an amount of ≤8 mol.-%, preferably of ≤6 mol.-%, and more preferably of ≤4 mol.-%, like from 0.1 to 4 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof.

Additionally or alternatively, if at least a part of the surface of the at least one natural calcium carbonate comprises a phosphoric acid ester blend comprising phosphoric acid and salty reaction products thereof, it is preferred that the phosphoric acid ester blend comprises the phosphoric acid and salty reaction products thereof in an amount of ≤10 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof. For example, the phosphoric acid ester blend comprises the phosphoric acid and salty reaction products thereof in an amount of ≤8 mol.-%, preferably of ≤6 mol.-%, and more preferably of ≤4 mol.-%, like from 0.1 to 4 mol.-%, based on the molar sum of the one or more phosphoric acid mono-ester and salty reaction products thereof and the one or more phosphoric acid di-ester and salty reaction products thereof and one or more phosphoric acid tri-ester and the phosphoric acid and salty reaction products thereof.

If the phosphoric acid ester blend further comprises phosphoric acid and salty reaction products thereof and one or more phosphoric acid tri-ester, it is thus preferred that the molar ratio of the phosphoric acid and salty reaction products thereof to the one or more phosphoric acid mono-ester and salty reaction products thereof to the one or more phosphoric acid di-ester and salty reaction products thereof to the one or more phosphoric acid tri-ester in the phosphoric acid ester blend is ≤10 mol.-%: ≤40 mol.-%: ≥40 mol. %: ≤10 mol.-%, based on the molar sum of the one or more phosphoric acid mono-ester and salty reaction products thereof and the one or more phosphoric acid di-ester and salty reaction products thereof and the one or more phosphoric acid tri-ester and the phosphoric acid and salty reaction products thereof.

The wording "molar ratio of the phosphoric acid and salty reaction products thereof to the one or more phosphoric acid mono-ester and salty reaction products thereof to the one or more phosphoric acid di-ester and salty reaction products thereof to the one or more phosphoric acid tri-ester" in the meaning of the present invention refers to the sum of the molecular weight of the phosphoric acid and the sum of the molecular weight of the phosphoric acid molecules in the salty reaction products thereof to the sum of the molecular weight of the phosphoric acid mono-ester molecules and the sum of the molecular weight of the phosphoric acid mono-ester molecules in the salty reaction products thereof to the sum of the molecular weight of the phosphoric acid di-ester molecules and the sum of the molecular weight of the phosphoric acid di-ester molecules in the salty reaction products thereof to the sum of the molecular weight of the phosphoric acid tri-ester molecules.

It is appreciated that the phosphoric acid ester blend may comprise salty reaction products obtained from contacting the at least one natural calcium carbonate with the one or more phosphoric acid mono-ester and one or more phosphoric acid di-ester and optionally phosphoric acid. In such a case, the phosphoric acid ester blend preferably comprises salty reaction products such as one or more calcium, magnesium and/or aluminium salts of phosphoric acid mono-esters and one or more calcium, magnesium and/or aluminium salts of phosphoric acid di-ester and optionally one or more calcium, magnesium and/or aluminium salts of phosphoric acid. Preferably, the phosphoric acid ester blend comprises salty reaction products such as one or more calcium and/or magnesium salts of phosphoric acid mono-esters and one or more calcium and/or magnesium salts of phosphoric acid di-ester and optionally one or more calcium and/or magnesium salts of phosphoric acid.

In one embodiment of the present invention, the one or more phosphoric acid mono-ester and/or the one or more phosphoric acid di-ester and optionally the phosphoric acid may be at least partially neutralized by one or more hydroxides of a mono and/or bi and/or trivalent cation and/or one or more salts of a weak acid of a mono and/or bi and/or trivalent cation before the at least one surface-treated natural calcium carbonate is prepared. The one or more hydroxides of a bi and/or trivalent cation may be selected from Ca(OH)$_2$, Mg(OH)$_2$, Al(OH)$_3$ and mixtures thereof.

Additionally or alternatively, if the one or more phosphoric acid mono-ester and/or the one or more phosphoric acid di-ester and optionally the phosphoric acid is at least partially neutralized by one or more hydroxides and/or one or more salts of a weak acid of a monovalent cation, the amount of monovalent cations is preferably ≤10 mol.-%, based on the molar sum of acidic groups in the one or more phosphoric acid mono-ester and the one or more phosphoric acid di-ester and optionally the phosphoric acid, the one or more hydroxide and/or the one or more salt of a weak acid of a monovalent cation to neutralize may be selected from LiOH, NaOH, KOH, Na$_2$CO$_3$, Li$_2$CO$_3$, K$_2$CO$_3$ and mixtures thereof.

In one embodiment of the present invention, the bivalent cations used for the partial neutralization of the one or more phosphoric acid mono-ester and/or the one or more phosphoric acid di-ester and optional the phosphoric acid are derived from salts of weak acids of such cations, preferably from carbonates and/or borates, such as calcium carbonate.

The term "weak acid" in the meaning of the present application refers to a Brønsted-Lowry acid, i.e. an H$_3$O$^+$-ion provider, featuring a pK$_a$ of >2, preferably from 4 to 7.

Accordingly, the phosphoric acid ester blend of the treatment layer may further comprise salty reaction products such as one or more calcium and/or magnesium salts of phosphoric acid mono-esters and one or more calcium and/or magnesium salts of phosphoric acid di-ester and optionally one or more calcium and/or magnesium salts of phosphoric acid. Additionally or alternatively, the phosphoric acid ester blend of the treatment layer further comprises salty reaction products such as one or more aluminium salts of phosphoric acid mono-esters and one or more aluminium salts of phosphoric acid di-ester and optionally one or more aluminium salts of phosphoric acid. Additionally or alternatively, the phosphoric acid ester blend of the treatment layer further comprises salty reaction products such as one or more lithium salts of phosphoric acid mono-esters and one or more lithium salts of phosphoric acid di-ester and optionally one or more lithium salts of phosphoric acid. Additionally or alternatively, the phosphoric acid ester blend of the treatment layer further comprises salty reaction products such as one or more sodium salts of phosphoric acid mono-esters and one or more sodium salts of phosphoric acid di-ester and optionally one or more sodium salts of phosphoric acid. Additionally or alternatively, the phosphoric acid ester blend of the treatment layer further comprises salty reaction products such as one or more potassium salts of phosphoric acid mono-esters and one or more potassium salts of phosphoric acid di-ester and optionally one or more potassium salts of phosphoric acid.

If the one or more phosphoric acid mono-ester and/or the one or more phosphoric acid di-ester and optionally the phosphoric acid is at least partially neutralized by one or more hydroxides and/or one or more salts of a weak acid of a monovalent cation, the treatment layer and/or the phosphoric acid ester blend preferably comprises an amount of monovalent cations of ≤10 mol.-%, based on the molar sum of acidic groups in the one or more phosphoric acid mono-ester and the one or more phosphoric acid di-ester and optionally the phosphoric acid.

In one embodiment of the present invention, the phosphoric acid ester blend of the treatment layer may further comprise additional surface treatment agents that do not correspond to the one or more phosphoric acid mono-ester, one or more phosphoric acid di-ester and the optional one or more phosphoric acid tri-ester and/or phosphoric acid of the present invention.

In one embodiment, the molar ratio of the one or more phosphoric acid mono-ester and/or the one or more phosphoric acid di-ester to the salty reaction products thereof is from 99.9:0.1 to 0.1:99.9, preferably from 70:30 to 90:10.

The wording "molar ratio of the one or more phosphoric acid mono-ester and/or the one or more phosphoric acid di-ester to the salty reaction products thereof" in the meaning of the present invention refers to the sum of the molecular weight of the phosphoric acid mono-ester molecules and/or the sum of the molecular weight of the phosphoric acid di-ester molecules to the sum of the molecular weight of the phosphoric acid mono-ester molecules in the salty reaction products thereof and/or the sum of the phosphoric acid di-ester molecules in the salty reaction products thereof.

Methods for preparing the surface-treated natural calcium carbonate treated with at least one phosphoric acid ester blend and suitable compounds for coating are described e.g. in EP 2 770 017 A1, which is thus incorporated herewith by reference. According to another embodiment of the present invention, the surface-treated natural calcium carbonate comprises a treatment layer on at least a part of the surface of the at least one natural calcium carbonate, wherein the treatment layer comprises at least one saturated aliphatic linear or branched carboxylic acid and salty reaction products thereof.

For example, the treatment layer comprises a saturated aliphatic linear or branched carboxylic acid having a total amount of carbon atoms from C4 to C24 and/or salty reaction products thereof.

The term "salty reaction products" of the saturated aliphatic linear or branched carboxylic acid in the meaning of the present invention refers to products obtained by contacting the at least one natural calcium carbonate with the at least one saturated aliphatic linear or branched carboxylic acid. Said reaction products are formed between at least a part of the applied at least one saturated aliphatic linear or branched carboxylic acid and reactive molecules located at the surface of the at least one natural calcium carbonate.

The aliphatic carboxylic acid in the meaning of the present invention may be selected from one or more linear chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of octanoic acid, myristic acid, palmitic acid, stearic acid and mixtures thereof.

For example, the aliphatic linear or branched carboxylic acid is octanoic acid or stearic acid. Preferably, the aliphatic linear or branched carboxylic acid is stearic acid.

In one embodiment, the molar ratio of the at least one saturated aliphatic linear or branched carboxylic acid to the salty reaction product(s) thereof is from 99.9:0.1 to 0.1:99.9, preferably from 70:30 to 90:10.

The wording "molar ratio of the at least one saturated aliphatic linear or branched carboxylic acid to the salty reaction product(s) thereof" in the meaning of the present invention refers to the sum of the molecular weight of the saturated aliphatic linear or branched carboxylic acid to the sum of the molecular weight of the saturated aliphatic linear or branched carboxylic acid in the salty reaction products.

According to another embodiment of the present invention, the surface treated natural calcium carbonate comprises a treatment layer on at least a part of the surface of the at least one natural calcium carbonate, wherein the treatment layer comprises at least one aliphatic aldehyde and/or salty reaction products thereof.

In this regard, the at least one aliphatic aldehyde represents a surface treatment agent and may be selected from any linear, branched or alicyclic, substituted or non-substituted, saturated or unsaturated aliphatic aldehyde. Said aldehyde is preferably chosen such that the number of carbon atoms is greater than or equal to 6 and more preferably greater than or equal to 8. Furthermore, said aldehyde has generally a number of carbon atoms that is lower or equal to 14, preferably lower or equal to 12 and more preferably lower or equal to 10. In one preferred embodiment, the number of carbon atoms of the aliphatic aldehyde is between 6 and 14, preferably between 6 and 12 and more preferably between 6 and 10.

In another preferred embodiment, the at least one aliphatic aldehyde is preferably chosen such that the number of carbon atoms is between 6 and 12, more preferably between 6 and 9, and most preferably 8 or 9.

The aliphatic aldehyde may be selected from the group of aliphatic aldehydes consisting of hexanal, (E)-2-hexenal, (Z)-2-hexenal, (E)-3-hexenal, (Z)-3-hexenal, (E)-4-hexenal, (Z)-4-hexenal, 5-hexenal, heptanal, (E)-2-heptenal, (Z)-2-heptenal, (E)-3-heptenal, (Z)-3-heptenal, (E)-4-heptenal, (Z)-4-heptenal, (E)-5-heptenal, (Z)-5-heptenal, 6-heptenal, octanal, (E)-2-octenal, (Z)-2-octenal, (E)-3-octenal, (Z)-3-octenal, (E)-4-octenal, (Z)-4-octenal, (E)-5-octenal, (Z)-5-octenal, (E)-6-octenal, (Z)-6-octenal, 7-octenal, nonanal, (E)-2-nonenal, (Z)-2-nonenal, (E)-3-nonenal, (Z)-3-nonenal, (E)-4-nonenal, (Z)-4-nonenal, (E)-5-nonenal, (Z)-5-nonenal, (E)-6-nonenal, (Z)-6-nonenal, (E)-6-nonenal, (Z)-6-nonenal, (E)-7-nonenal, (Z)-7-nonenal, 8-nonenal, decanal, (E)-2-decenal, (Z)-2-decenal, (E)-3-decenal, (Z)-3-decenal, (E)-4-decenal, (Z)-4-decenal, (E)-5-decenal, (Z)-5-decenal, (E)-6-decenal, (Z)-6-decenal, (E)-7-decenal, (Z)-7-decenal, (E)-8-decenal, (Z)-8-decenal, 9-decenal, undecanal, (E)-2-undecenal, (Z)-2-undecenal, (E)-3-undecenal, (Z)-3-undecenal, (E)-4-undecenal, (Z)-4-undecenal, (E)-5-undecenal, (Z)-5-undecenal, (E)-6-undecenal, (Z)-6-undecenal, (E)-7-undecenal, (Z)-7-undecenal, (E)-8-undecenal, (Z)-8-undecenal, (E)-9-undecenal, (Z)-9-undecenal, 10-undecenal, dodecanal, (E)-2-dodecenal, (Z)-2-dodecenal, (E)-3-dodecenal, (Z)-3-dodecenal, (E)-4-dodecenal, (Z)-4-dodecenal, (E)-5-dodecenal, (Z)-5-dodecenal, (E)-6-dodecenal, (Z)-6-dodecenal, (E)-7-dodecenal, (Z)-7-dodecenal, (E)-8-dodecenal, (Z)-8-dodecenal, (E)-9-dodecenal, (Z)-9-dodecenal, (E)-10-dodecenal, (Z)-10-dodecenal, 11-dodecenal, tridecanal, (E)-2-tridecenal, (Z)-2-tridecenal, (E)-3-tridecenal, (Z)-3-tridecenal, (E)-4-tridecenal, (Z)-4-tridecenal, (E)-5-tridecenal, (Z)-5-tridecenal, (E)-6-tridecenal, (Z)-6-tridecenal, (E)-7-tridecenal, (Z)-7-tridecenal, (E)-8-tridecenal, (Z)-8-tridecenal, (E)-9-tridecenal, (Z)-9-tridecenal, (E)-10-tridecenal, (Z)-10-tridecenal, (E)-11-tridecenal, (Z)-11-tridecenal, 12-tridecenal, butadecanal, (E)-2-butadecenal, (Z)-2-butadecenal, (E)-3-butadecenal, (Z)-3-butadecenal, (E)-4-butadecenal, (Z)-4-butadecenal, (E)-5-butadecenal, (Z)-5-butadecenal, (E)-6-butadecenal, (Z)-6-butadecenal, (E)-7-butadecenal, (Z)-7-butadecenal, (E)-8-butadecenal, (Z)-8-butadecenal, (E)-9-butadecenal, (Z)-9-butadecenal, (E)-10-butadecenal, (Z)-10-butadecenal, (E)-11-butadecenal, (Z)-11-butadecenal, (E)-12-butadecenal, (Z)-12-butadecenal, 13-butadecenal, and mixtures thereof. In a preferred embodiment, the aliphatic aldehyde is selected from the group consisting of hexanal, (E)-2-hexenal, (Z)-2-hexenal, (E)-3-hexenal, (Z)-3-hexenal, (E)-4-hexenal, (Z)-4-hexenal, 5-hexenal, heptanal, (E)-2-heptenal, (Z)-2-heptenal, (E)-3-heptenal, (Z)-3-heptenal, (E)-4-heptenal, (Z)-4-heptenal, (E)-5-heptenal, (Z)-5-heptenal, 6-heptenal, octanal, (E)-2-octenal, (Z)-2-octenal, (E)-3-octenal, (Z)-3-octenal, (E)-4-octenal, (Z)-4-octenal, (E)-5-octenal, (Z)-5-octenal, (E)-6-octenal, (Z)-6-octenal, 7-octenal, nonanal, (E)-2-nonenal, (Z)-2-nonenal, (E)-3-nonenal, (Z)-3-nonenal, (E)-4-nonenal, (Z)-4-nonenal, (E)-5-nonenal, (Z)-5-nonenal, (E)-6-nonenal, (Z)-6-nonenal, (E)-7-nonenal, (Z)-7-nonenal, 8-nonenal and mixtures thereof.

In another preferred embodiment, the at least one aliphatic aldehyde is a saturated aliphatic aldehyde. In this case the aliphatic aldehyde is selected from the group consisting of hexanal, heptanal, octanal, nonanal, decanal, undecanal, dodecanal, tridecanal, butadecanal and mixtures thereof. Preferably, the at least one aliphatic aldehyde in the form of a saturated aliphatic aldehyde is selected from the group consisting of hexanal, heptanal, octanal, nonanal, decanal, undecanal, dodecanal and mixtures thereof. For instance, the at least one aliphatic aldehyde in the form of a saturated aliphatic aldehyde is selected from octanal, nonanal and mixtures thereof.

If a mixture of two aliphatic aldehydes, e.g. two saturated aliphatic aldehydes such as octanal and nonanal is used according to the present invention, the weight ratio of octanal and nonanal is from 70:30 to 30:70 and more preferably from 60:40 to 40:60. In one especially preferred embodiment of the present invention, the weight ratio of octanal and nonanal is about 1:1.

The term "salty reaction products" of the at least one aliphatic aldehyde in the meaning of the present invention refers to products obtained by contacting the at least one natural calcium carbonate with the at least one aliphatic aldehyde. Said reaction products are formed between at least a part of the applied at least one aliphatic aldehyde and reactive molecules located at the surface of the at least one natural calcium carbonate.

In one embodiment, the molar ratio of the at least one aliphatic aldehyde to the salty reaction product(s) thereof is from 99.9:0.1 to 0.1:99.9, preferably from 70:30 to 90:10.

The wording "molar ratio of the at least one aliphatic aldehyde to the salty reaction product(s) thereof" in the meaning of the present invention refers to the sum of the molecular weight of the aliphatic aldehyde to the sum of the molecular weight of the aliphatic aldehyde in the salty reaction products.

Methods for preparing the surface-treated natural calcium carbonate treated with at least one aliphatic aldehyde and suitable compounds for coating are described e.g. in EP 2 390 285 A1, which is thus incorporated herewith by reference.

According to another embodiment of the present invention, the surface-treated natural calcium carbonate comprises a treatment layer on at least a part of the surface of the at least one natural calcium carbonate, wherein the treatment layer comprises at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof.

The term "succinic anhydride", also called dihydro-2,5-furandione, succinic acid anhydride or succinyl oxide, has the molecular formula $C_4H_4O_3$ and is the acid anhydride of succinic acid.

The term "mono-substituted" succinic anhydride in the meaning of the present invention refers to a succinic anhydride wherein a hydrogen atom is substituted by another substituent.

The term "mono-substituted" succinic acid in the meaning of the present invention refers to a succinic acid wherein a hydrogen atom is substituted by another substituent.

The term "salty reaction products" of the at least one mono-substituted succinic anhydride refers to products obtained by contacting the at least one natural calcium carbonate with one or more mono-substituted succinic anhydride(s). Said salty reaction products are formed between the mono-substituted succinic acid which is formed from the applied mono-substituted succinic anhydride and reactive molecules located at the surface of the at least one natural calcium carbonate. Alternatively, said salty reaction products are formed between the mono-substituted succinic acid, which may optionally be present with the at least one mono-substituted succinic anhydride, and reactive molecules located at the surface of the at least one natural calcium carbonate.

For example, the treatment layer on the surface of the at least one natural calcium carbonate comprises at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof. More preferably, the treatment layer on the surface of the at least one natural calcium carbonate comprises at least one mono-substituted succinic anhydride consisting of succinic anhydride mono-substituted with a group selected from a linear, branched, aliphatic and cyclic group having a total amount of carbon atoms from at least C2 to C30, preferably from C3 to C20 and most preferably from C4 to C18 in the substituent and/or salty reaction products thereof.

Methods for preparing the natural calcium carbonate treated with at least one mono-substituted succinic anhydride consisting of succinic anhydride mono-substituted with a group selected from a linear, branched, aliphatic and cyclic group having a total amount of carbon atoms from at least C2 to C30 in the substituent and suitable compounds for coating are described e.g. in WO2016/023937 A1 and EP 2 722 368 A1, which are thus incorporated herewith by reference.

According to another embodiment of the present invention, the surface-treated natural calcium carbonate comprises a treatment layer on at least a part of the surface of the at least one natural calcium carbonate, wherein the treatment layer comprises at least one polydialkylsiloxane.

Preferred polydialkylsiloxanes are described e.g. in US 2004/0097616 A1. Most preferred are polydialkylsiloxanes selected from the group consisting of polydimethylsiloxane, preferably dimethicone, polydiethylsiloxane and polymethylphenylsiloxane and/or mixtures thereof.

For example, the at least one polydialkylsiloxane is preferably a polydimethylsiloxane (PDMS).

The at least one polydialkylsiloxane is preferably present in a quantity such that the total amount of said polydialkylsiloxane on at least a part of the surface of the at least one natural calcium carbonate, is less than 1 000 ppm, more preferably less than 800 ppm and most preferably less than 600 ppm. For example, the total amount of the polydialkylsiloxane on at least a part of the surface of the at least one natural calcium carbonate, is from 100 to 1 000 ppm, more preferably from 200 to 800 ppm and most preferably from 300 to 600 ppm, e.g. from 400 to 600 ppm.

The treatment layer on the surface of the at least one natural calcium carbonate preferably comprises at least one saturated aliphatic linear or branched carboxylic acid and salty reaction products thereof, and/or at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof.

More preferably, the treatment layer on the surface of the at least one natural calcium carbonate comprises at least one saturated aliphatic linear or branched carboxylic acid and salty reaction products thereof. Most preferably, the treatment layer on the surface of the at least one natural calcium carbonate comprises stearic acid and salty reaction products thereof. For example, the treatment layer on the surface of the at least one natural calcium carbonate consists of stearic acid and salty reaction products thereof.

In one embodiment, the treatment layer on at least a part of the surface of the at least one natural calcium carbonate comprises a mixture of the above materials, preferably a mixture of two materials.

Thus, an after treatment layer may be present on the treatment layer.

An "after treatment layer" in the meaning of the present invention refers to a layer, preferably a monolayer of a surface treatment agent which can be different from the treatment layer, the "after treatment layer" is located on the "treatment layer".

In one preferred embodiment the surface treatment of the at least one natural calcium carbonate is carried out in two steps, the first step comprising a treatment by a phosphoric acid ester blend of one or more phosphoric acid mono-ester and/or one or more phosphoric acid di-ester or at least one saturated aliphatic linear or branched carboxylic acid or at least one aliphatic aldehyde or at least one mono-substituted succinic anhydride consisting of succinic anhydride mono-substituted with a group selected from a linear, branched, aliphatic and cyclic group having a total amount of carbon atoms from at least C2 to C30 in the substituent for forming a treatment layer and the second step comprising a treatment by at least one polydialkylsiloxane for forming an after treatment layer.

In another embodiment, the surface treatment is carried out by treating the at least one natural calcium carbonate simultaneously with a phosphoric acid ester blend of one or more phosphoric acid mono-ester and/or one or more phosphoric acid di-ester or at least one saturated aliphatic linear or branched carboxylic acid or at least one aliphatic aldehyde or at least one mono-substituted succinic anhydride consisting of succinic anhydride mono-substituted with a group selected from a linear, branched, aliphatic and cyclic group having a total amount of carbon atoms from at least C2 to C30 in the substituent and at least one polydialkylsiloxane for forming a treatment layer.

Furthermore, the surface treatment can be carried out by treating the at least one natural calcium carbonate first with a polydialkylsiloxane and subsequently with phosphoric acid ester blend of one or more phosphoric acid mono-ester and/or one or more phosphoric acid di-ester or at least one saturated aliphatic linear or branched carboxylic acid or at least one aliphatic aldehyde or at least one mono-substituted succinic anhydride consisting of succinic anhydride mono-substituted with a group selected from a linear, branched, aliphatic and cyclic group having a total amount of carbon atoms from at least C2 to C30 in the substituent.

Preferably, the after treatment layer comprises at least one polydialkylsiloxane.

Thus, the treatment layer on at least a part of the surface of the at least one natural calcium carbonate preferably comprises a phosphoric acid ester blend of one or more phosphoric acid mono-ester and salty reaction products thereof and/or one or more phosphoric acid di-ester and salty reaction products thereof and the after treatment layer comprises at least one polydialkylsiloxane.

Alternatively, the treatment layer on at least a part of the surface of the at least one natural calcium carbonate comprises at least one saturated aliphatic linear or branched carboxylic acid and salty reaction products thereof and the after treatment layer comprises at least one polydialkylsiloxane.

Alternatively, the treatment layer on at least a part of the surface of the at least one natural calcium carbonate comprises at least one aliphatic aldehyde and/or salty reaction products thereof and the after treatment layer comprises at least one polydialkylsiloxane.

Alternatively, the treatment layer on at least a part of the surface of the at least one natural calcium carbonate comprises at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof and the after treatment layer comprises at least one polydialkylsiloxane.

More preferably, the treatment layer on at least a part of the surface of the at least one natural calcium carbonate comprises, most preferably consists of, at least one saturated aliphatic linear or branched carboxylic acid and salty reaction products thereof or at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof and the after treatment layer comprises, more preferably consists of, at least one polydialkylsiloxane. For example, the treatment layer on at least a part of the surface of the at least one natural calcium carbonate comprises, most preferably consists of, at least one saturated aliphatic linear or branched carboxylic acid and salty reaction products thereof and the after treatment layer comprises, more preferably consists of, at least one polydialkylsiloxane.

According to one embodiment the salty reaction product (s) of the phosphoric acid ester, the blend of one or more phosphoric acid mono-ester, the one or more phosphoric acid di-ester or the at least one saturated aliphatic linear or branched carboxylic acid, the at least one aliphatic aldehyde, or at least one mono-substituted succinic anhydride are one or more calcium and/or magnesium salts thereof.

Thus, it is appreciated that the at least one surface-treated natural calcium carbonate comprises, and preferably consists of, at least one natural calcium carbonate and a treatment layer comprising i. a phosphoric acid ester blend of one or more phosphoric acid mono-ester and salty reaction products thereof and/or one or more phosphoric acid di-ester and salty reaction products thereof, and/or
ii. at least one saturated aliphatic linear or branched carboxylic acid and salty reaction products thereof, and/or
iii. at least one aliphatic aldehyde and/or salty reaction products thereof, and/or
iv. at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof, and/or
v. at least one polydialkylsiloxane, and/or
vi. mixtures of the materials according to i. to v.

The treatment layer is formed on the surface of said at least one natural calcium carbonate.

It is preferred that the surface-treated natural calcium carbonate comprises the treatment layer in an amount from 0.05 to 2.3 wt.-%, based on the total dry weight of the at least one natural calcium carbonate. According to one embodiment, the surface-treated natural calcium carbonate comprises the treatment layer in an amount of from 0.1 to 2.0 wt.-%, more preferably from 0.1 to 1.9 wt.-% and most preferably from 0.15 to 1.8 wt.-%, based on the total dry weight of the at least one natural calcium carbonate.

The treatment layer is preferably characterized in that the total weight of the phosphoric acid ester blend of one or more phosphoric acid mono-ester and salty reaction products thereof and/or one or more phosphoric acid di-ester and salty reaction products thereof, and/or at least one saturated aliphatic linear or branched carboxylic acid and salty reaction products thereof, and/or at least one aliphatic aldehyde and/or salty reaction products thereof, and/or at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof, and/or at least one polydialkylsiloxane, and/or mixtures of said materials on the surface of the surface-treated natural calcium carbonate is from 0.05 to 1 wt.-%/m$^2$, more preferably from 0.1 to 0.5 wt.-%/m$^2$ and most preferably from 0.15 to 0.25 wt.-%/m$^2$ of the at least one natural calcium carbonate.

In one embodiment of the present invention, the treatment layer is characterized in that the total weight of the phosphoric acid ester blend of one or more phosphoric acid mono-ester and salty reaction products thereof and/or one or more phosphoric acid di-ester and salty reaction products thereof, and/or at least one saturated aliphatic linear or branched carboxylic acid and salty reaction products thereof, and/or at least one aliphatic aldehyde and/or salty reaction products thereof, and/or at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof, and/or at least one polydialkylsiloxane, and/or mixtures of said materials on the surface of the surface-treated natural calcium carbonate is from 0.1 to 5 mg/m$^2$, more preferably from 0.25 to 4.5 mg/m$^2$ and most preferably from 1.0 to 4.0 mg/m$^2$ of the at least one natural calcium carbonate.

It is preferred that the surface-treated natural calcium carbonate preferably features a volatile onset temperature ≥250° C. For example, the surface-treated natural calcium carbonate a volatile onset temperature ≥260° C. or ≥270° C. In one embodiment, the surface-treated natural calcium carbonate features a volatile onset temperature of 250° C. to 400° C., preferably from 260° C. to 400° C. and most preferably from 270° C. to 400° C.

Additionally or alternatively, the surface-treated natural calcium carbonate features a total volatiles between 25 and 350° C. of less than 0.25% by mass, and preferably of less than 0.23% by mass, e.g. of from 0.04 to 0.21% by mass, preferably from 0.08 to 0.15% by mass, more preferably from 0.1 to 0.12% by mass.

Furthermore, the surface-treated natural calcium carbonate features a low water pick up susceptibility. It is preferred that the moisture pick up susceptibility of the surface-treated natural calcium carbonate is such that its total surface moisture level is less than 1 mg/g of dry natural calcium carbonate, at a temperature of about +23° C. (±2° C.). For example, the surface-treated natural calcium carbonate has a moisture pick up susceptibility of from 0.1 to 3.0 mg/g, more preferably of from 0.2 to 2.5 mg/g and most preferably of from 0.2 to 2.0 mg/g of dry natural calcium carbonate after at a temperature of +23 C (±2° C.).

In order to achieve a mono or multi-layer biaxially oriented polypropylene film having a low density, i.e. of ≤0.72 g/cm$^3$, at high opacity, the at least one layer of the mono or multi-layer biaxially oriented polypropylene film comprises the at least one natural calcium carbonate in an amount ranging from 5.0 to 21.0 wt.-%, based on the total weight of the layer.

According to one embodiment, the at least one layer of the mono or multi-layer biaxially oriented polypropylene film comprises the at least one natural calcium carbonate in an amount ranging from 7.0 to 18.0 wt.-% and preferably from 8.0 to 16.0 wt.-%, based on the total weight of the layer.

According to one aspect of the present invention, the at least one natural calcium carbonate described above is used as cavitation agent in a mono or multi-layer biaxially oriented polypropylene film having a density of ≤0.72 g/cm$^3$.

Mono or Multi-Layer Biaxially Oriented Polypropylene Film

According to the present invention a mono or multi-layer biaxially oriented polypropylene film is provided, wherein at least one layer of the film comprises at least one polypropylene in an amount ranging from 79.0 to 95.0 wt.-% and at least one natural calcium carbonate in an amount ranging from 5.0 to 21.0 wt.-%, based on the total weight of the layer, wherein the at least one natural calcium carbonate has a weight median particle size d$_{50}$ from 3.2 μm to 8.0 μm.

It is appreciated that the mono or multi-layer biaxially oriented polypropylene film especially features a low density. Thus, the mono or multi-layer biaxially oriented polypropylene film, especially the at least one polypropylene and at least one natural calcium carbonate comprising layer, has a density of ≤0.72 g/cm$^3$, preferably of ≤0.70 g/cm$^3$, more preferably of ≤0.68 g/cm$^3$, still more preferably of ≤0.65 g/cm$^3$, even more preferably in the range from 0.40 to 0.65 g/cm$^3$ and most preferably from 0.50 to 0.65 g/cm$^3$. For example, the mono or multi-layer biaxially oriented polypropylene film, especially the at least one polypropylene and at least one natural calcium carbonate comprising layer, has a density of <0.62 g/cm$^3$, even more preferably in the range between ≥0.4 and <0.62 g/cm$^3$.

Another advantage of the present invention is that the mono or multi-layer biaxially oriented polypropylene film especially features a high opacity. It is appreciated that the mono or multi-layer biaxially oriented polypropylene film, especially the at least one polypropylene and at least one natural calcium carbonate comprising layer, has an opacity of ≥40%, preferably of ≥55%, even more preferably of ≥60% and most preferably of ≥65%.

The mono or multi-layer biaxially oriented polypropylene film, especially the at least one polypropylene and at least one natural calcium carbonate comprising layer, is advantageous as it has specifically low density at high opaque appearance.

Thus, it is preferred that the mono or multi-layer biaxially oriented polypropylene film, especially the at least one polypropylene and at least one natural calcium carbonate comprising layer, has a density of ≤0.72 g/cm$^3$, preferably of ≤0.70 g/cm$^3$, more preferably of ≤0.68 g/cm$^3$, still more preferably of ≤0.65 g/cm$^3$, even more preferably in the range from 0.40 to 0.65 g/cm$^3$ and most preferably from 0.50 to 0.65 g/cm$^3$, e.g. in the range between ≥0.4 and <0.62 g/cm$^3$, and an opacity of ≥40%, preferably of ≥55%, even more preferably of ≥60% and most preferably of ≥65%.

According to one embodiment, the median thickness of the mono or multi-layer biaxially oriented polypropylene film, especially the at least one polypropylene and at least one natural calcium carbonate comprising layer, is from 3.2 to 500 μm, preferably from 4 to 400 m, more preferably from 5 to 300 μm and most preferably from 6 to 250 m, e.g. from 8 to 150 μm.

According to one embodiment, the mono or multi-layer biaxially oriented polypropylene film, especially the at least one polypropylene and at least one natural calcium carbonate comprising layer, has a median thickness from 3.2 to 500 μm, preferably from 4 to 400 m, more preferably from 5 to 300 μm and most preferably from 6 to 250 m, e.g. from 8 to 150 μm and a density of ≤0.72 g/cm$^3$, preferably of ≤0.70 g/cm$^3$, more preferably of ≤0.68 g/cm$^3$, still more preferably of ≤0.65 g/cm$^3$, even more preferably in the range from 0.40 to 0.65 g/cm$^3$ and most preferably from 0.50 to 0.65 g/cm$^3$, e.g. in the range between ≥0.4 and <0.62 g/cm$^3$.

It is appreciated that the biaxially oriented polypropylene film is a mono or multi-layer film.

In case of a multi-layer biaxially oriented polypropylene film, the film consists of two or more layers such as two to ten layers, preferably three layers, which are adjacent to each other. If the multi-layer film is a three layer film, the film preferably has the film structure A-B-A or A-B-C. In the multi-layer film, the core layer is preferably voided, i.e. the layer comprising the at least one polypropylene and at least one natural calcium carbonate. In one embodiment, the multi-layer film comprises a barrier layer which is located between two adjacent layers. The "barrier layer" in the meaning of the present application refers to a diffusion barrier, e.g. an oxygen and/or water vapour and/or gas barrier, which is used for protecting the packed goods from various external influences.

The barrier layer can be of any material known in the art as being suitable for this purpose. For example, the barrier layer can be an aluminium layer, $Al_2O_3$ layer, $SiO_x$ layer, ethylene vinyl alcohol layer, poly(vinyl alcohol) layer, or polyvinylidene chloride layer and mixtures thereof.

It is appreciated that the median thickness of the mono or multi-layer biaxially oriented polypropylene film, especially of the layer comprising the at least one polypropylene and at least one natural calcium carbonate, may vary in a broad range depending on the product to be produced.

For example, the at least one polypropylene and at least one natural calcium carbonate comprising layer, is preferably of higher thickness than the other individual layers, i.e. the layers not containing the at least one polypropylene and/or at least one natural calcium carbonate. Alternatively, the at least one polypropylene and at least one natural calcium carbonate comprising layer is of about the same thickness than the other layers together, i.e. the layers not containing the at least one polypropylene and/or at least one natural calcium carbonate, preferably the at least one polypropylene and at least one natural calcium carbonate.

Preferably, the mono or multi-layer biaxially oriented polypropylene film, especially the at least one polypropylene and at least one natural calcium carbonate comprising layer, has a median thickness from 3.2 to 500 μm, preferably from 4 to 400 μm, more preferably from 5 to 300 μm and most preferably from 6 to 250 μm, e.g. from 8 to 150 μm.

If not otherwise indicated, the mechanical and optical properties described herein refer to an at least one polypropylene and at least one natural calcium carbonate comprising layer or film prepared in accordance with the example section set out herein below, i.e. by using a biaxial lab stretcher (Model Maxi Grip 750S Bi-axial Laboratory Stretching Frame, from Dr. Collin GmbH, Germany) under the described conditions. It is thus appreciated that the results for an at least one polypropylene and at least one natural calcium carbonate comprising layer or film prepared under differing conditions may deviate from the mechanical and optical properties defined herein.

Furthermore, the mono or multi-layer biaxially oriented polypropylene film, especially the at least one polypropylene and at least one natural calcium carbonate comprising layer, is advantageous as the mechanical properties of the film, especially the layer, are kept on a high level.

For example, at a density of ≤0.72 $g/cm^3$, preferably of ≤0.70 $g/cm^3$, more preferably of ≤0.68 $g/cm^3$, still more preferably of ≤0.65 $g/cm^3$, even more preferably in the range from 0.40 to 0.65 $g/cm^3$ and most preferably from 0.50 to 0.65 $g/cm^3$, e.g. in the range between ≥0.4 and <0.62 $g/cm^3$, the mono or multi-layer biaxially oriented polypropylene film, especially the at least one polypropylene and at least one natural calcium carbonate comprising layer, has a tensile strength in machine and transverse direction, measured according to ISO 527-3, in the range from 70 to 200 MPa, more preferably in the range from 75 to 190 MPa and most preferably in the range from 80 to 180 MPa. It is appreciated that the values for the tensile strength in machine and transverse direction do not significantly differ if the stretching process is carried out simultaneously.

In one embodiment, at a density of ≤0.72 $g/cm^3$, preferably of ≤0.70 $g/cm^3$, more preferably of ≤0.68 $g/cm^3$, still more preferably of ≤0.65 $g/cm^3$, even more preferably in the range from 0.40 to 0.65 $g/cm^3$ and most preferably from 0.50 to 0.65 $g/cm^3$, e.g. in the range between ≥0.4 and <0.62 $g/cm^3$, the mono or multi-layer biaxially oriented polypropylene film, especially the at least one polypropylene and at least one natural calcium carbonate comprising layer, has a modulus of elasticity in machine and transverse direction, measured according to ISO 527-3, in the range from 1 000 to 5 000 MPa, more preferably in the range from 1 100 to 4 500 MPa and most preferably in the range from 1 200 to 4 000 MPa. It is appreciated that the values for the modulus of elasticity in machine and transverse direction do not significantly differ if the stretching process is carried out simultaneously.

In one embodiment, at a density of ≤0.72 $g/cm^3$, preferably of ≤0.70 $g/cm^3$, more preferably of ≤0.68 $g/cm^3$, still more preferably of ≤0.65 $g/cm^3$, even more preferably in the range from 0.40 to 0.65 $g/cm^3$ and most preferably from 0.50 to 0.65 $g/cm^3$, e.g. in the range between ≥0.4 and <0.62 $g/cm^3$, the mono or multi-layer biaxially oriented polypropylene film, especially the at least one polypropylene and at least one natural calcium carbonate comprising layer, has a maximum elongation at break in machine and transverse direction, measured according to ISO 527-3, in the range from 18 to 90%, more preferably in the range from 20 to 80% and most preferably in the range from 22 to 70%. It is appreciated that the values for the elongation at break in machine and transverse direction do not significantly differ if the stretching process is carried out simultaneously.

Furthermore, it is appreciated that the mono or multi-layer biaxially oriented polypropylene film, especially the at least one polypropylene and at least one natural calcium carbonate comprising layer, is microporous and has good optical properties. The microporosity and good optical properties can be deduced from the following data regarding the water vapour transmission rate (WVTR) and e.g. L*.

The term "microporous" or "microporosity" refers to a mono or multi-layer biaxially oriented polypropylene film, especially the at least one polypropylene and at least one natural calcium carbonate comprising layer, which enable vapors or gases to flow through them such that they are breathable or have breathability while at the same time inhibiting or stopping the flow of liquids through them.

The microporosity of the mono or multi-layer biaxially oriented polypropylene film, especially the at least one polypropylene and at least one natural calcium carbonate comprising layer, can be measured by its water vapour transmission rate. According to one embodiment the mono or multi-layer biaxially oriented polypropylene film, especially the at least one polypropylene and at least one natural calcium carbonate comprising layer, has a water vapour transmission rate (WVTR) below 100 $g/(m^2\ day)$, preferably from 15 to 100 $g/(m^2\ day)$, measured with a Lyssy L80-5000 measuring device according to ASTM E398.

According to one embodiment, the mono or multi-layer biaxially oriented polypropylene film, especially the at least one polypropylene and at least one natural calcium carbonate comprising layer, preferably at a density of ≤0.72 $g/cm^3$, preferably of ≤0.70 $g/cm^3$, more preferably of ≤0.68 $g/cm^3$, still more preferably of ≤0.65 $g/cm^3$, even more preferably in the range from 0.40 to 0.65 $g/cm^3$ and most preferably from 0.50 to 0.65 $g/cm^3$, e.g. in the range between ≥0.4 and <0.62 $g/cm^3$, has a L*, according to DIN 6174, from 60 to 100, preferably from 70 to 100 and most preferably from 80 to 98.

According to one embodiment the at least one polypropylene and at least one natural calcium carbonate comprising layer of the mono or multi-layer biaxially oriented polypropylene film further comprises at least one additive selected from the group comprising a cavitating agent, an antioxidant, an acid scavenger, a processing aid, an antistatic additive, an extrusion aid, a nucleating agent, a light stabilizer, an optical brightener, a blue dye, an antiblocking agent, a white pigment and mixtures thereof, which is/are dispersed in the at least one polypropylene.

The at least one polypropylene and at least one natural calcium carbonate comprising layer of the mono or multi-layer biaxially oriented polypropylene film comprises the at least one additive in an amount ranging from 0.1 to 30.0 wt.-%, preferably from 2.0 to 25.0 wt.-%, more preferably from 4.0 to 22.0 wt.-%, even more preferably from 5.0 to 20.0 wt.-%, still more preferably from 6.0 to 17 wt.-%, and most preferably from 8.0 to 15.0 wt.-%, based on the total weight of the layer.

In one embodiment, the at least one polypropylene and at least one natural calcium carbonate comprising layer of the mono or multi-layer biaxially oriented polypropylene film comprises the at least one additive in an amount being below the amount of the at least one natural calcium carbonate. For example, the at least one polypropylene and at least one natural calcium carbonate comprising layer of the mono or multi-layer biaxially oriented polypropylene film comprises the at least one additive in an amount being at least 20 wt.-%, more preferably at least 30 wt.-% and most preferably at least 50 wt.-%, based on the total weight of the at least one natural calcium carbonate, below the amount of the at least one natural calcium carbonate.

Thus, if the mono or multi-layer biaxially oriented polypropylene film comprises at least one additive, the at least one additive is preferably present in the same layer as the at least one polypropylene and at least one natural calcium carbonate. Depending on the function of the additive it may be present in the outer layer, e.g. UV-stabilisation agents or anti-blocking agents.

It is appreciated that the presence of a further cavitation agent in the at least one polypropylene and at least one natural calcium carbonate comprising layer of the mono or multi-layer biaxially oriented polypropylene film is advantageous as it further improves the formation of voids during the preparation of the film or layer. However, when the further cavitation agent is a polymeric one like polybutylene terephthalate (PBT) it does typically not help to increase the opaque appearance of the film or layer.

Cavitating agents that may be used are selected from a polymeric cavitation agent, preferably a thermoplastic polymer, more preferably crosslinked with a crosslinking agent, selected from the group consisting of a polyketone, a polysulphone, a fluoropolymer, preferable polytetrafluoroethylene, a polyacetal, an ionomer, an acrylic resin, preferably polymethylmethacrylate, a polystyrene resin, a polyurethane, a polyamide, a polycarbonate, a polyacrylonitrile, a polyethylene terephthalate, a polybutylene terephthalate, and a copolymerized resin and mixtures thereof, and/or an inorganic cavitation agent, preferably selected from inorganic fillers (different from the at least one natural calcium carbonate), pigments, solid microspheres, hollow microspheres, metals, and mixtures thereof.

It is to be noted that the polymeric cavitation agent is not soluble in the at least one polypropylene. Thus, the at least one polypropylene forms a continuous phase, i.e. a matrix, and dispersed therein is the thermoplastic polymer, i.e. forms a dispersed phase.

The term "different from the at least one natural calcium carbonate" refers to an inorganic filler that differs in the kind or weight median particle size $d_{50}$ from the at least one natural calcium carbonate. Thus, it is appreciated that the inorganic filler may be also a natural calcium carbonate having a weight median particle size $d_{50}$ of <3.2 µm, e.g. between ≥0.5 and <3.2 µm.

Preferably, the inorganic filler different from the at least one natural calcium carbonate is selected from the group consisting of alumina, silica, titanium dioxide, alkaline metal salts, such as barium carbonate, calcium sulphate, barium sulphate and mixtures thereof.

The weight median particle size $d_{50}$ of the inorganic filler different from the at least one natural calcium carbonate is preferably below the weight median particle size $d_{50}$ of the at least one natural calcium carbonate. Thus, the inorganic filler different from the at least one natural calcium carbonate may have a weight median particle size $d_{50}$ in the range from 0.5 µm to ≤3.2 µm, preferably from 0.5 µm to 2.5 µm, more preferably from 0.5 µm to 1.8 µm, and most preferably from 0.6 µm to 1.8 µm. In one embodiment, the inorganic filler different from the at least one natural calcium carbonate is selected from the group consisting of talcum, alumina, silica, alkaline metal salts, such as barium carbonate, calcium sulphate, barium sulphate and mixtures thereof. In this embodiment, the at least one polypropylene and at least one natural calcium carbonate comprising layer of the mono or multi-layer biaxially oriented polypropylene film is thus preferably free of titanium dioxide.

Preferably, the solid microspheres or the hollow microspheres may be made of glass or ceramic.

Additionally or alternatively, the mono or multi-layer biaxially oriented polypropylene film may additionally comprise additives which are typically used as additives in the films to be produced. Advantageously, they are already added to the polymer or the polymer mixture prior to melting. Alternatively, said additives can be added to the masterbatch.

For example, the mono or multi-layer biaxially oriented polypropylene film comprises at least one additive selected from the group consisting of an antioxidant, an acid scavenger, a processing aid, an antistatic additive, an extrusion aid, a nucleating agent, a light stabilizer, an optical brightener, a blue dye, an antiblocking agent, a white pigment and mixtures thereof.

Suitable antioxidants for mono or multi-layer biaxially oriented polypropylene films are blends of phenolic and phosphite antioxidants, such as Lowinox BOPP 415 (Addivant, Waldkraiburg, Germany), ALBlend 925P (SI Group, Pratteln Switzerland).

It is appreciated that light stabilizers which are UV stabilizers or UV absorbers are chemical compounds which can intervene in the physical and chemical processes of light-induced degradation. Carbon black and other pigments can provide some degree of protection from the adverse effects of light, but these substances are unsuitable for white films since they lead to discoloration or colour change. The only additives suitable for white films are organic or organometallic compounds which give no, or only an extremely low level of, colour or colour change to the film to be stabilized. Light stabilizers which are suitable UV stabilizers absorb at least 70%, preferably 80%, particularly preferably 90%, of the UV light in the wavelength range from 180 to 380 nm, preferably from 280 to 350 nm. Those which are particularly suitable are those, which in the temperature range from 260 to 300° C., are thermally stable, i.e. do not decompose and do not cause release of gases. Examples of light stabilizers which are suitable UV stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines, preferably 2-hydroxybenzotriazoles and triazines. Most preferably, the light stabilizer is selected from benzotriazoles and/or benzophenones. Examples of suitable benzotriazoles and/or benzophenones are described in U.S. Pat. No. 8,088,848, which is thus incorporated herewith by reference. The amounts of the light stabilizers used are typically from 10 to 50 000 ppm, preferably from 20 to 30 000 ppm, and most preferably from 50 to 25 000 ppm, based on the total weight of the film, preferably the at least one polypropylene and at least one natural calcium carbonate comprising layer.

A further additive present in the film, preferably the at least one polypropylene and at least one natural calcium carbonate comprising layer, if desired is an optical brightener. The optical brighteners according to the invention are capable of absorbing UV radiation in the wavelength range from about 360 to 380 nm and of emitting this again as visible, longer-wavelength, blue-violet light. Suitable optical brighteners are bisbenzoxazoles, phenylcoumarins and bisstearylbiphenyls, in particular phenyl coumarin, and particularly preferably triazine-phenylcoumarin (Tinopal®, BASF, Ludwigshafen, Germany). The amounts of the optical brighteners used are typically from 10 to 50 000 ppm, preferably from 20 to 30 000 ppm, and most preferably from 50 to 25 000 ppm, based on the total weight of the film, preferably at least one polypropylene and at least one natural calcium carbonate comprising layer.

Suitable white pigments are preferably titanium dioxide, barium sulphate, calcium carbonate, kaolin and silica, and preference is given to titanium dioxide and barium sulphate. The titanium dioxide particles may be composed of anatase or of brookite or of rutile, preferably predominantly of rutile, which has higher hiding power than anatase. In a preferred embodiment, 95 wt.-% of the titanium dioxide particles are rutile. The weight median particle size $d_{50}$ of the white pigment is typically below the weight median particle size $d_{50}$ of the at least one natural calcium carbonate and thus the white pigment does not act as a voiding agent. Preferable, the weight median particle size $d_{50}$ of the white pigment is in the range from 0.10 to 0.30 µm. The amount of the white pigment in the film, preferably the at least one polypropylene and at least one natural calcium carbonate comprising layer, is usefully from 0.3 to 25 wt.-%, based on the total weight of the film, preferably the at least one polypropylene and at least one natural calcium carbonate comprising layer.

Additionally or alternatively, blue dyes, preferably blue dyes soluble in polypropylene, may also be added to the film, preferably the at least one polypropylene and at least one natural calcium carbonate comprising layer, if this is useful. For example, blue dyes which have proven successful are selected from cobalt blue, ultramarine blue and anthraquinone dyes, in particular Sudan blue 2 (BASF, Ludwigshafen, Germany). The amounts of the blue dyes used are typically from 10 to 10 000 ppm, preferably from 20 to 5 000 ppm, and most preferably from 50 to 1 000 ppm, based on the total weight of the film, preferably the at least one polypropylene and at least one natural calcium carbonate comprising layer.

Additionally or alternatively, antiblocking agents may also be added to the film, preferably the at least one polypropylene and at least one natural calcium carbonate comprising layer, if this is useful. Typical antiblocking agents are inorganic and/or organic particles, for example calcium carbonate different from the at least one natural calcium carbonate comprising layer, amorphous silica, talcum, magnesium carbonate, barium carbonate, calcium sulphate, barium sulphate, lithium phosphate, calcium phosphate, magnesium phosphate, aluminium oxide, carbon black, titanium dioxide, kaolin, or crosslinked polymer particles, for example polystyrene, acrylate, PMMA particles, or crosslinked silicones. Muscovite mica having an average particle size (weighted average) of 4.0 to 12 µm, preferably 6 to 10 µm, is also particularly suitable. As is generally known, mica is composed of platelet-like silicates, the aspect ratio of which is preferably in the range from 5 to 50. Mixtures of two and more different antiblocking agents or mixtures of antiblocking agents having the same composition but a different particle size can also be chosen as additives. The particles can be added directly or by means of masterbatches to the polymers of the individual layers of the film in the respective advantageous concentrations during extrusion. Antiblocking agents are preferably added to the outer layer(s), i.e. the layer being free of the at least one natural calcium carbonate. The amounts of the antiblocking agent is generally from 0.01 to 1 wt.-%, based on the total weight of the film, preferably the at least one polypropylene and at least one natural calcium carbonate comprising layer.

The nucleating agent can be an a-nucleating agent or β-nucleating agent. The α-nucleating agent is preferably selected from the group comprising dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3-trideoxy-4,6:5,7-bis-O-[(4-propylphenyl)methylene]-nonitol, vinylcycloalkane polymer, vinylalkane polymer, and mixtures thereof. It is appreciated that the at least one polypropylene and at least one natural calcium carbonate comprising layer typically contains not more than 2 000 ppm, more preferably of 1 to 2 000 ppm, more preferably of 5 to 1 500 ppm of the nucleating agent.

Any antioxidant, acid scavenger, processing aid, antistatic additive and/or extrusion aid well known in the art as being suitable for the product to be prepared and commercially available can be used.

It is appreciated that the at least one additive can be present in the at least one polypropylene and at least one natural calcium carbonate comprising layer. In case of a multi-layer film, the at least one additive can be present in the at least one polypropylene and at least one natural calcium carbonate comprising layer and/or in at least one of the additional layer(s).

The mono or multi-layer biaxially oriented polypropylene film of the present invention may be produced by any method known in the art. According to one embodiment, a process of producing a mono or multi-layer biaxially oriented polypropylene film comprises the steps of:

a) providing a composition comprising at least one polypropylene and at least one natural calcium carbonate, and b) forming a film from the composition of step a), and c) stretching the film obtained in step b) in machine direction (MD) and transverse direction (TD) in any order, wherein the stretching in machine direction (MD) and transverse direction (TD) is carried out sequential or simultaneously, wherein the at least one natural calcium carbonate has a weight median particle size $d_{50}$ from 3.2 µm to 8.0 µm.

The composition of the at least one polypropylene and at least one natural calcium carbonate provided in process step a) can be a compound obtained by mixing and/or kneading the at least one polypropylene and at least one natural calcium carbonate to form a mixture. The at least one polypropylene and at least one natural calcium carbonate, and, if present, other optional additives, may be mixed and/or kneaded by the use of a suitable mixer, e.g. a Henschel mixer, a super mixer, a tumbler type mixer or the like. The compounding step may be done with a suitable extruder, preferably by a twin screw extruder (co or counter-rotating) or by any other suitable continuous compounding equipment, e.g. a continuous co-kneader (Buss), a continuous mixer (Farrel Pomini), a ring extruder (Extricom) or the like. The continuous polymer mass from extrusion may be either pelletized by (hot cut) die face pelletizing with underwater pelletizing, eccentric pelletizing and water ring pelletizing or by (cold cut) strand pelletizing with underwater and conventional strand pelletizing to form the extruded polymer mass into pellets.

Preferably, the composition of the at least one polypropylene and at least one natural calcium carbonate provided in process step a) is a compound obtained by mixing and/or kneading the at least one polypropylene and at least one natural calcium carbonate to form a mixture and continuously pelletizing the obtained mixture. For example, the continuously pelletizing is carried out under water.

Optionally, the compounding step may also be performed with a discontinuous or batch process using an internal (batch) mixer, e.g. a Banburry mixer (HF Mixing Group) or a Brabender mixer (Brabender) or the like.

According to one embodiment the compound comprises the at least one natural calcium carbonate in an amount of from ≤30 wt.-%, preferably from 0.5 to 30 wt.-% and more preferably from 5 to 30 wt.-%, based on the total weight of the compound.

According to an optional embodiment, the composition provided in process step a) further comprises one or more of the additives/compounds described above.

According to one embodiment the composition provided in process step a) is a masterbatch. According to a preferred embodiment the masterbatch comprises the at least one natural calcium carbonate in an amount between >30 and 85 wt.-%, preferably from 35 to 80 wt.-% and more preferably from 40 to 75 wt.-%, based on the total weight of the masterbatch. The masterbatch may be in form of pellets, beads, or granules.

It is appreciated that the masterbatch can be prepared by the same method as described for the compound above. Thus, the masterbatch is preferably obtained by mixing and/or kneading the at least one polypropylene and the at least one natural calcium carbonate to form a mixture. Preferably, the composition of the at least one polypropylene and the at least one natural calcium carbonate provided in process step a) is a masterbatch obtained by mixing and/or kneading the at least one polypropylene and the at least one natural calcium carbonate to form a mixture and continuously pelletizing the obtained mixture.

It is to be noted that the compound differs from the masterbatch in that the compound is not diluted during further processing. That is to say, the masterbatch is diluted during further processing.

The inventors of the present invention found that the use of the at least one natural calcium carbonate of the present invention in the masterbatch may result in a homogenously filled mono or multi-layer biaxially oriented polypropylene film and thus results in a specifically low density at high opacity.

The masterbatch is preferably mixed with the same or different polypropylene (as used as matrix in the masterbatch) and/or at least one additive described above before process step b) is carried out. According to a preferred embodiment, the masterbatch is mixed with the same polypropylene (as used as matrix in the masterbatch) before process step b) is carried out.

In one embodiment, the at least one additive is added to the masterbatch.

Alternatively, the composition comprising at least one polypropylene and at least one natural calcium carbonate of step a) is obtained by adding the at least one natural calcium carbonate to the polymerization process of the at least one polypropylene.

That is to say, the composition comprising at least one natural calcium carbonate of step a) is obtained by adding the at least one natural calcium carbonate either before or during or after to the polymerization process of the at least one polypropylene. For example, the composition comprising at least one polypropylene and at least one natural calcium carbonate of step a) is obtained by adding the at least one natural calcium carbonate either before or after, preferably after, to the polymerization process of the at least one polypropylene. Thus, the composition comprising at least one polypropylene and at least one natural calcium carbonate of step a) can be provided as ready to use composition.

The process step b) may be carried out by any well-known techniques used for preparing polymer films. Examples of suitable film extrusion techniques are blown film extrusion or cast film extrusion. Preferably, process step b) is carried out by cast film extrusion.

Accordingly, process step b) is preferably an extrusion process.

In a preferred extrusion process for forming the film, the melted composition of the at least one polypropylene and the at least one natural calcium carbonate provided in process step a) is extruded through a slot die and, in the form of a substantially amorphous prefilm, quenched on a chill roll.

In process step c) the film obtained in process step b) is stretched in machine direction (MD) and transverse direction (TD) in any order.

For example, the film obtained in process step b) is reheated and stretched in machine direction (MD) and transverse direction (TD), or in transverse direction (TD) and machine direction (MD), or in machine direction (MD, in transverse direction (TD) and again in machine direction (MD) and/or transverse direction (TD). Preferably, the film obtained in process step b) is reheated and stretched in machine direction (MD) and transverse direction (TD) Thus, the stretching in step c) in machine direction (MD) and transverse direction (TD) can be carried out sequentially, simultaneously or with a LISIM process or a combination thereof. Preferably, the stretching in step c) in machine direction (MD) and transverse direction (TD) is carried out sequentially.

The stretching step c) may be carried out by any means known in the art. Such methods and devices for performing stretching step c) are known in the art, for example as LISIM or MESIM method (mechanical simultaneous stretching) known. LISIM procedures are described in detail in EP 1112167 and EP 0785858, which is herewith incorporated by reference. A MESIM method is described in US 2006/0115548, which is likewise herewith incorporated by reference. For example, the simultaneously biaxial stretching process can be performed by a batch type biaxial stretching machine such as the Model Maxi Grip 750S (from Dr. Collin GmbH, Germany) or the Bruckner Karo IV (from Bruckner Maschinenbau GmbH & Co. KG, Germany). This stretching process makes the film anisotropic due to molecular orientation.

The first stretching in machine direction (MD) may, if desired, be carried out simultaneously with the stretching in transverse direction (TD) (simultaneous stretching). The film is then cooled and wound up.

During the stretching step the polypropylene may be delaminated from the surface of the at least one natural calcium carbonate, whereby voids are formed in the mono or multi-layer biaxially oriented polypropylene film.

The stretching may be carried out by one step or by several steps. According to one embodiment process step c) is carried out from 1 to 10 times.

Stretch magnification determines film breakage at high stretching as well as breathability and the water vapour transmission of the obtained film, and so excessively high stretch magnification and excessively low stretch magnification are desirably avoided. According to one embodiment, in process step c), the film obtained in step b) is stretched to a stretch magnification from 3 to 12 times, more preferably 4 to 11 times, most preferably 4 to 5 times into each direction.

Preferably, stretching step c) is carried out in that the film obtained in step b) is stretched
 a) in machine direction (MD) with a stretching ratio from 3 to 10 preferably from 4 to 8, and/or
 b) in transverse direction (TD) with a stretching ratio from 4 to 12, preferably from 4 to 11

According to one embodiment process step c) is carried out at a stretching temperature ranging from 120 to 180° C., more preferably from 130 to 160° C.

In case the biaxially oriented polypropylene film is a multi-layer biaxially oriented polypropylene film, the film can be prepared by co-extrusion or by laminating the layers before or after stretching step c) (extrusion lamination). Preferably, the multi-layer biaxially oriented polypropylene film is prepared by laminating the layers after stretching step c). In one embodiment, a barrier layer is introduced between the layers of the multi-layer biaxially oriented polypropylene film. For example, the multi-layer biaxially oriented polypropylene film comprises an aluminium layer, $Al_2O_3$ layer, $SiO_x$ layer, ethylene vinyl alcohol layer, poly(vinyl alcohol) layer, or polyvinylidene chloride layer, and mixtures thereof, which is/are located between two adjacent layers. Thus, the biaxially oriented polypropylene film can be prepared by adding a barrier layer in the laminating step.

The inventors of the present invention found that the mono or multi-layer biaxially oriented polypropylene film according to the present invention, especially the at least one polypropylene and at least one natural calcium carbonate comprising layer, has low density, especially the density is below the density typically achieved for biaxially oriented films or layers using calcium carbonate having a weight median particle size $d_{50}$ of <3.2 μm as cavitation agents. Furthermore, the biaxially oriented polypropylene film, especially the at least one polypropylene and at least one natural calcium carbonate comprising layer, has an opaque appearance, especially the density is below the density typically achieved for biaxially oriented films or layers using calcium carbonate having a weight median particle size $d_{50}$ of <3.2 μm as cavitation agents. Furthermore, the mono or multi-layer biaxially oriented polypropylene film, especially the at least one polypropylene and at least one natural calcium carbonate comprising layer, provides good mechanical properties such as tensile strength, elongation at break or modulus of elasticity and further optical properties.

The mono or multi-layer biaxially oriented polypropylene film according to the present invention can be used in many different applications. According to one embodiment, the mono or multi-layer biaxially oriented polypropylene film is used in flower overwrapping, cigarette overwrapping, CD overwrapping, shrinkable films, release films, twist films, mat films, non-electrical capacitor films, food packagings, flexible packagings, candy bar wrappers, hygiene articles, labels, textiles, stationery goods, photo albums, envelopes, windows, catalogues, manuals, packaging bags, maps, audio/video cassettes, industrial tapes, preferably pressure sensitive tapes, box sealing tapes, masking tapes, laminated metallized brochure catalogues, print laminations, carton boxes, cosmetic boxes, restaurant menus, electrical articles, preferably cable insulations and capacitors.

According to a further aspect of the present invention, an article comprising the mono or multi-layer biaxially oriented polypropylene film according to the present invention is provided, wherein the article is selected from the group consisting of flower overwrapping, cigarette overwrapping, CD overwrapping, shrinkable films, release films, twist films, mat films, non-electrical capacitor films, food packaging, flexible packaging, candy bar wrappers, hygiene articles, labels, textiles, stationery goods, photo albums, envelopes, windows, catalogues, manuals, packaging bags, maps, audio/video cassettes, industrial tapes, preferably pressure sensitive tapes, box sealing tapes, masking tapes, laminated metallized brochure catalogues, print laminations, carton boxes, cosmetic boxes, restaurant menus, electrical articles, preferably cable insulations and capacitors.

The scope and interest of the invention will be better understood based on the following examples which are intended to illustrate certain embodiments of the present invention and are non-limitative.

EXAMPLES

1 Measurement Methods and Materials

In the following, measurement methods and materials implemented in the examples are described.

MFR

The melt flow rate MFR is measured according to ISO 1133 (230° C., 2.16 kg load).

MVR

The melt volume rate MVR is measured according to ISO 1133 (250° C./2.16 kg)

Crystallization Temperature $T_c$

The crystallization temperature is measured by differential scanning calorimetry (DSC) on a Mettler-Toledo "Polymer DSC instrument (Mettler-Toledo (Schweiz) GmbH, Switzerland). The crystallization curve was obtained during 10° C./min cooling and heating scans between 30° C. and 225° C. Crystallization temperatures were taken as the peak of endotherms and exotherms.

Particle Size

The particle distribution of the untreated ground calcium carbonate-comprising filler material was measured using a Sedigraph 5120 from the company Micromeritics, USA. The method and the instruments are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics.

Specific Surface Area (BET)

Throughout the present document, the specific surface area (in $m^2/g$) of the filler material is determined using the BET method (using nitrogen as adsorbing gas), which is well known to the skilled man (ISO 9277:2010).

Ash Content

The ash content in [wt.-%] of the masterbatches and films was determined by incineration of a sample in an incineration crucible which is put into an incineration furnace at 570° C. for 2 h. The ash content was measured as the total amount of remaining inorganic residues.

Film Thickness

The film thickness was determined using a digital measuring slide Mitutoyo IP 66 (Mitutoyo Europe GmbH, Neuss, Germany). Measured values were reported in µm.

Density of a Film or Layer

The density was determined from a test piece whereby a precise area of film (100 mm×100 mm) is cut and weighed on an analytical balance. An average film thickness was determined by taking nine thickness measurements allocated over the whole film surface. The density was calculated and reported in [g/cm$^3$]. Also an average yield in m$^2$/kg and the unit weight in g/m$^2$ can be calculated from these values.

Brightness Rv

Colorimetric values were measured using a Datacolor Elrepho spectrometer (Datacolor AG, Switzerland), Ry was measured according to DIN 53163 and CIELAB colour differences L*, a* and b* were determined according to DIN 6174.

Gloss 60° (20°, 850)

The gloss was measured at 600, additionally also at 200 or 850 may be measured. All measurements were done according to ISO 2813 using a trigloss Glossmeter (Byk-Gardner GmbH, Germany).

Opacity

The opacity measurements were done according to DIN 53146 by measuring the whiteness of a film sample on a black and a white substrate using a Byk-Gardner Spectro-Guide (Byk-Gardner GmbH, Germany). The opacity is the contrast ratio of the two measurements. The units are percent % and a perfectly opaque material will have an opacity value of 100%.

Transmittance

Light Transmittance (transparency) is the ratio of total transmitted light to the amount of incident light. Light transmittance was measured using haze-guard plus (Byk Gardener, Germany) test equipment according to ASTM D1003.

Tensile Strength

The produced film samples were tested on their tensile behaviour on a Zwick/Roell Allround Z020 equipment (Zwick GmbH & Co. KG, Germany) according to ISO 527-3. Tensile testing was done on samples taken in machine direction (MD) and in transverse direction (TD). At least five samples are tested for each formulation and average values are calculated. Tensile modulus [MPa], tensile strength [MPa], and elongation at break [%] are reported. The sample size of the film samples is 15 mm×170 mm and the testing length was 5 cm.

Maximum Elongation at Break

Elongation at break determination was performed according to ISO 527-3. The film specimen width was of 15 mm and the testing length was 5 cm.

Tensile E-Modulus (Modulus of Elasticity)

Tensile E-modulus determination was performed according to ISO 527-3. The film specimen width was of 15 mm and the testing length was 5 cm. The E-modulus corresponded to the inclination of the tensile test curve between the points at 0.02% and 2% elongation.

Water Vapour Transmission Rate (WVTR)

The WVTR value of the polypropylene films was measured with a Lyssy L80-5000 (PBI-Dansensor A/S, Denmark) measuring device according to ASTM E398.

2 Materials

CC1 (inventive): Natural ground calcium carbonate, commercially available from Omya International AG, Switzerland ($d_{50}$: 5 µm; $d_{98}$: 20 m), surface-treated with 0.5 wt.-% stearic acid (commercially available from Sigma-Aldrich, Croda) based on the total weight of the natural ground calcium carbonate. BET: 2.1 m$^2$/g.

CC2 (inventive): Natural ground calcium carbonate, commercially available from Omya International AG, Switzerland ($d_{50}$: 5 µm; $d_{98}$: 30 µm), without surface-treatment. BET: 2.1 m$^2$/g.

CC3 (comparative): Natural ground calcium carbonate, commercially available from Omya International AG, Switzerland ($d_{50}$: 3 µm; $d_{98}$: 12.5 µm), without surface-treatment. BET: 2 m$^2$/g.

CC4 (comparative): Natural ground calcium carbonate, commercially available from Omya International AG, Switzerland ($d_{50}$: 1.4 µm; $d_{98}$: 5 µm; content of particles <1 µm=28%), surface-treated with 0.7 wt.-% stearic acid (commercially available from Sigma-Aldrich, Croda) based on the total weight of the natural ground calcium carbonate. BET: 5.1 m$^2$/g.

P1 (comparative): Polyethylene terephthalate (PET), Valox 334, commercially available from Sabic, the Netherlands, MVR (250° C./2.16 kg) of 105 cm$^3$/10 min (ISO 1133; according to the technical data sheet).

P2 (comparative): Polyethylene terephthalate (PET), Valox 3104, commercially available from Sabic, the Netherlands, MVR (250° C./2.16 kg) of 40 cm$^3$/10 min (ISO 1133; according to the technical data sheet).

P3 (comparative): Polyethylene terephthalate (PET), Valox 195, commercially available from Sabic, the Netherlands, melt viscosity of 82 000 mPas (determined according to Sabic method) (according to the technical data sheet).

PO1 (polymer matrix): Polypropylene homopolymer, Dow PP H-358-02, MFR of 2.1 g/10 min (230° C., 2.16 kg), density of 0.90 g/cm$^3$ (according to technical data sheet), commercially available from Dow Europe, Switzerland.

EXAMPLES

Example 1—Preparation of Masterbatches

Polypropylene masterbatches containing the calcium carbonate fillers CC1 to CC4 and the polymers P1 to P3 and PO1 were continuously prepared on a lab scale Buss kneader (Buss PR46 from Buss AG, Switzerland). The compositions and filler contents of the prepared masterbatches are compiled in Table 1 below. The precise filler content was determined by the ash content.

TABLE 1

Composition and filler content of prepared masterbatches.

| Masterbatch | Filler or PBT | Filler content [wt.-%][a] | Ash content [wt.-%] |
|---|---|---|---|
| MB1 (inventive) | CC1 | 70 | 68.4 |
| MB2 (inventive) | CC2 | 70 | 69.7 |
| MB3 (comparative) | CC3 | 70 | 69.8 |
| MB4 (comparative) | CC4 | 70 | 68.7 |
| MB5 (comparative) | P1 | 70 | — |
| MB6 (comparative) | P2 | 70 | — |
| MB7 (comparative) | P3 | 70 | — |

[a] refers to the overall amount of filler or PBT and PO1, this means 30 wt.-% PO1.

Example 2—Preparation of Polypropylene Cast Films

Cast films were prepared on a Collin Laboratory Film Line (Dr. Collin GmbH, Germany) with a twin screw extruder with a diameter of 30 mm wide T-die and a take-up system, which had temperature controlled chill-rolls. The chilled roll was kept 20 mm from the T-die to produce a polypropylene sheet having a thickness of around 1 500 μm. The extruder and die temperatures were consistent throughout the experiment. The die temperature was set at 250° C.; the line speed was 0.8 m/min. The masterbatch or polymer was mixed with the neat polymer PO1 to receive cast films with the concentrations given in Table 2.

TABLE 2

Compositions and properties of prepared cast films

| Film Sample | Masterbatch or polymer | Filler content [wt.-%] | Ash content [wt.-%] |
|---|---|---|---|
| 1 (comp.) | no | 0 | 0 |
| 2 (inv.) | MB1 | 15 | 15.3 |
| 3 (inv.) | MB1 | 20 | 19.5 |
| 4 (inv.) | MB2 | 15 | 14.0 |
| 5 (inv.) | MB2 | 20 | 19.0 |
| 6 (comp.) | MB3 | 15 | 14.2 |
| 7 (comp.) | MB3 | 20 | 19.0 |
| 8 (comp.) | MB4 | 15 | 14.7 |
| 9 (comp.) | MB4 | 20 | 18.2 |
| 10 (comp.) | MB5 | 6 | — |
| 11 (comp.) | MB5 | 8 | — |
| 12 (comp.) | MB6 | 6 | — |
| 13 (comp.) | MB6 | 8 | — |
| 14 (comp.) | MB7 | 6 | — |
| 15 (comp.) | MB7 | 8 | — |

All films shown in Table 2 are cast films which were produced in good quality with visual good appearance.

Example 3—Preparation of Biaxially Stretched Polypropylene Films

A biaxial lab stretcher (Model Maxi Grip 750S Bi-axial Laboratory Stretching Frame, from Dr. Collin GmbH, Germany) was used to stretch the cast films. The cast film with dimensions of 135 mm×135 mm and a film thickness of around 1 500 μm (exact values given in Table 2) was gripped by 9×9 clips and heated by the infrared system up to 135° C. measured on the cast film surface. The preheat time before drawing was fixed at 90 seconds at 145° C., then the film was stretched by simultaneously biaxially stretching to the final stretch ratio with an acceleration of 6 000 mm/s$^2$×6 000 mm/s$^2$ resulting in speed of 250 mm/s×250 mm/s. After being stretched to the final dimensions, the film was immediately air cooled to room temperature by a fan and then was removed from the stretcher. Films were drawn to the target draw ratio of 4.6×4.6 (360%×360%). The stretching ratio and temperatures were kept constant for all samples.

The physical, optical and barrier properties of the obtained oriented films are outlined in Table 3.

The results shown in Table 3 confirm that the inventive oriented polypropylene films have a good quality, a reduced density and a high opacity. The inventive films have also a high degree of whiteness, good barrier properties and good mechanical properties.

By comparing the results shown in Table 3, it can be seen that surprisingly a lower film density is obtained when a coarse calcium carbonate according to claim 1 is used (see Examples 2 to 5, $d_{50}$=5.0 μm), whereas the use of a finer calcium carbonate results in higher film densities (see Comparative Examples 6 and 7, $d_{50}$=3.0 μm). The inventive Examples 2 to 5 show film densities between 0.58 and 0.70 g/cm$^3$ and are not only superior to the Comparative Examples using a finer calcium carbonate but also to the Comparative Examples using an organic cavitation agent.

Furthermore, it can be gathered from Table 3 that the film thickness and the WVTR are under consideration of the usual deviations for all films approximately the same and are within the usual ranges for BOPP-films. Remarkably is also the significant improvement of the opacity when using a surface treated calcium carbonate (see Examples 2 and 3).

TABLE 3

Physical, optical and barrier properties of prepared biaxially stretched polypropylene films

| Sample | Film thickness [μm] | Density [g/cm$^3$] | Opacity [%] | Gloss 60° First side [GU]# | Gloss 60° Second side [GU]# | Brightness Ry [%] | CIE Lab L* [—] | WVTR [g/(m$^2$ · day] |
|---|---|---|---|---|---|---|---|---|
| 1 (comp.) | 36 | 0.89 | 13 | 81 | 100 | 2 | 90 | 15 |
| 2 (inv.) | 45 | 0.61 | 71 | 40 | 42 | 53 | 91 | 20 |
| 3 (inv.) | 39 | 0.58 | 72 | 26 | 49 | 57 | 92 | 28 |
| 4 (inv.) | 30 | 0.70 | 43 | 30 | 49 | 32 | 91 | 32 |
| 5 (inv.) | 32 | 0.61 | 46 | 22 | 50 | 35 | 92 | 39 |
| 6 (comp.) | 44 | 0.78 | 45 | 24 | 29 | 34 | 92 | 25 |
| 7 (comp.) | 31 | 0.73 | 54 | 23 | 33 | 42 | 92 | 27 |
| 8 (comp.) | 30 | 0.91 | 30 | 30 | 32 | 22 | 92 | 19 |
| 9 (comp.) | 33 | 0.86 | 62 | 25 | 28 | 48 | 92 | 18 |
| 10 (comp.) | 38 | 0.96 | 22 | 43 | 43 | 15 | 92 | 16 |
| 11 (comp.) | 24 | 0.89 | 16 | 24 | 31 | 17 | 92 | 25 |
| 12 (comp.) | 36 | 0.96 | 17 | 50 | 54 | 11 | 92 | 39 |
| 13 (comp.) | 36 | 0.96 | 16 | 21 | 23 | 13 | 92 | 39 |
| 14 (comp.) | 18 | 0.86 | 15 | 16 | 23 | 10 | 92 | 35 |
| 15 (comp.) | 17 | 0.83 | 15 | 10 | 17 | 11 | 93 | 41 |

Gloss units

The invention claimed is:

1. A mono or multi-layer biaxially oriented polypropylene film,
   wherein at least one layer of the film comprises at least one polypropylene in an amount ranging from 79.0 to 95.0 wt.-% and at least one natural calcium carbonate in an amount ranging from 5.0 to 21.0 wt.-%, based on the total weight of the layer, wherein the at least one natural calcium carbonate has a weight median particle size $d_{50}$ from 3.2 µm to 8.0 µm and the at least one natural calcium carbonate is marble and/or limestone and/or chalk, and wherein the at least one polypropylene and at least one natural calcium carbonate comprising layer of the film, has a density of <0.62 g/cm³.

2. The mono or multi-layer biaxially oriented polypropylene film of claim 1, wherein the at least one polypropylene and at least one natural calcium carbonate comprising layer of the film comprises
a) the at least one polypropylene in an amount ranging from 82.0 to 93.0 wt.-%, based on the total weight of the layer, and/or
b) the at least one natural calcium carbonate in an amount ranging from 7.0 to 18.0 wt.-%, based on the total weight of the layer.

3. The mono or multi-layer biaxially oriented polypropylene film of claim 1, wherein the at least one polypropylene is selected from the group of propylene homopolymers, propylene random copolymers, and terpolymers.

4. The mono or multi-layer biaxially oriented polypropylene film of claim 1, wherein the at least one polypropylene has
a) a melt flow rate (MFR) determined according to ISO 1133 (230° C., 2.16 kg) in the range from 0.01 to 20 g/10 min, and/or
b) a density determined according to ISO 1183 in the range from 0.880 g/cm³ to 0.920 g/cm³.

5. The mono or multi-layer biaxially oriented polypropylene film of claim 1, wherein the at least one natural calcium carbonate is a ground natural calcium carbonate.

6. The mono or multi-layer biaxially oriented polypropylene film of claim 1, wherein the at least one natural calcium carbonate is limestone and/or chalk.

7. The mono or multi-layer biaxially oriented polypropylene film of claim 1, wherein the at least one natural calcium carbonate has
a) a weight median particle size $d_{50}$ from 3.5 µm to 8.0 µm, and/or
b) a top cut particle size $d_{98}$ of ≤50.0 µm, and/or
c) a specific surface area (BET) of from 0.5 to 150 m²/g, as measured using nitrogen and the BET method according to ISO 9277.

8. The mono or multi-layer biaxially oriented polypropylene film of claim 1, wherein the at least one natural calcium carbonate is a surface-treated natural calcium carbonate comprising a treatment layer on the surface of the at least one natural calcium carbonate comprising
i. a phosphoric acid ester blend of one or more phosphoric acid mono-ester and salty reaction products thereof and/or one or more phosphoric acid di-ester and salty reaction products thereof, and/or
ii. at least one saturated aliphatic linear or branched carboxylic acid and salty reaction products thereof, and/or
iii. at least one aliphatic aldehyde and/or salty reaction products thereof, and/or
iv. at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof, and/or
v. at least one polydialkylsiloxane, and/or
vi. mixtures of the materials according to i. to v.

9. The mono or multi-layer biaxially oriented polypropylene film of claim 8, wherein the treatment layer on the surface of the at least one natural calcium carbonate comprises at least one saturated aliphatic linear or branched carboxylic acid and salty reaction products thereof, and/or at least one mono-substituted succinic anhydride consisting of succinic anhydride mono-substituted with a group selected from a linear, branched, aliphatic and cyclic group having a total amount of carbon atoms from at least C2 to C30 in the substituent and/or salty reaction products thereof.

10. The mono or multi-layer biaxially oriented polypropylene film of claim 8, wherein the surface-treated natural calcium carbonate comprises the treatment layer in an amount of from 0.05 to 2.3 wt.-%, based on the total dry weight of the at least one natural calcium carbonate.

11. The mono or multi-layer biaxially oriented polypropylene film of claim 1, wherein the at least one polypropylene and natural calcium carbonate comprising layer of the film further comprises at least one additive selected from the group consisting of a cavitating agent, pigments, solid microspheres, hollow microspheres, metals, an antioxidant, an acid scavenger, a processing aid, an antistatic additive, an extrusion aid, a nucleating agent, a light stabilizer, an optical brightener, a blue dye, an antiblocking agent and mixtures thereof, which is/are dispersed in the at least one polypropylene.

12. The mono or multi-layer biaxially oriented polypropylene film of claim 11, wherein the at least one polypropylene and at least one natural calcium carbonate comprising layer of the film comprises the at least one additive in an amount ranging from 0.1 to 30.0 wt.-%, based on the total weight of the layer.

13. The mono or multi-layer biaxially oriented polypropylene film of claim 1, wherein the at least one polypropylene and at least one natural calcium carbonate comprising layer of the film, has
a) a density of from 0.4 to 0.62 g/cm³, and/or
b) an opacity of ≥40%.

14. A process for producing a mono or multi-layer biaxially oriented polypropylene film comprising the steps of:
a) providing a composition comprising at least one polypropylene and at least one natural calcium carbonate, and
b) forming a film from the composition of step a), and
c) stretching the film obtained in step b) in machine direction (MD) and transverse direction (TD) in any order, wherein the stretching in machine direction (MD) and transverse direction (TD) is carried out sequential or simultaneously,
wherein the at least one natural calcium carbonate has a weight median particle size $d_{50}$ from 3.2 µm to 8.0 µm, and
wherein the film produced from step c) has a density of ≤0.62 g/cm³.

15. The process of claim 14, wherein the composition provided in step a) is a masterbatch obtained by mixing and/or kneading the at least one polypropylene and at least one natural calcium carbonate to form a mixture and continuously pelletizing the obtained mixture.

16. The process of claim 14, wherein the composition provided in step a) is a masterbatch comprising the at least one natural calcium carbonate in an amount between >30 and 85 wt.-%, based on the total weight of the masterbatch.

17. The process of claim 14, wherein the composition provided in step a) is a compound obtained by mixing and/or kneading the at least one polypropylene and at least one natural calcium carbonate to form a mixture and continuously pelletizing the obtained mixture.

18. The process of claim 14, wherein process steps a) and b) are carried out simultaneously.

19. The process of claim 14, wherein the composition comprising at least one polypropylene and at least one natural calcium carbonate of step a) is obtained by adding the at least one natural calcium carbonate to the polymerization process of the at least one polypropylene.

20. The mono or multi-layer biaxially oriented polypropylene film of claim 1, wherein the at least one polypropylene is a propylene homopolymer.

21. An article comprising a mono or multi-layer biaxially oriented polypropylene film according to claim 1, wherein the article is selected from the group consisting of flower overwrapping, cigarette overwrapping, CD overwrapping, shrinkable films, release films, twist films, mat films, non-electrical capacitor films, food packaging, flexible packaging, candy bar wrappers, hygiene articles, labels, textiles, stationery goods, photo albums, envelopes, windows, catalogues, manuals, packaging bags, maps, audio/video cassettes, industrial tapes, pressure sensitive tapes, box sealing tapes, masking tapes, laminated metallized brochure catalogues, print laminations, carton boxes, cosmetic boxes, restaurant menus, and electrical articles.

22. The mono or multi-layer biaxially oriented polypropylene film of claim 1, wherein the at least one natural calcium carbonate has a weight median particle size $d_{50}$ from 4.0 µm to 6.8 µm.

23. The mono or multi-layer biaxially oriented polypropylene film of claim 1, wherein the at least one polypropylene and at least one natural calcium carbonate comprising layer of the film, has an opacity of ≥40%.

* * * * *